US011703141B2

(12) United States Patent
Gross et al.

(10) Patent No.: US 11,703,141 B2
(45) Date of Patent: Jul. 18, 2023

(54) ELECTRIC VALVE INCLUDING MANUAL OVERRIDE

(71) Applicant: Donald Gross, Stevensville, MD (US)

(72) Inventors: Donald Gross, Stevensville, MD (US); David Parish, Castlerock, CO (US)

(73) Assignee: Donald Gross, Stevensville, MD (US)

( * ) Notice: Subject to any disclaimer, the term of this patent is extended or adjusted under 35 U.S.C. 154(b) by 451 days.

(21) Appl. No.: 16/867,653

(22) Filed: May 6, 2020

(65) Prior Publication Data

US 2020/0263799 A1     Aug. 20, 2020

Related U.S. Application Data

(63) Continuation-in-part of application No. 16/568,699, filed on Sep. 12, 2019, now Pat. No. 11,126,210, which is a continuation-in-part of application No. 15/381,849, filed on Dec. 16, 2016, now Pat. No. 10,473,227.

(51) Int. Cl.
| | |
|---|---|
| *F16K 31/04* | (2006.01) |
| *F16K 37/00* | (2006.01) |
| *B63B 79/40* | (2020.01) |
| *B63B 79/10* | (2020.01) |
| *B63B 43/00* | (2006.01) |

(52) U.S. Cl.
CPC ............ *F16K 31/046* (2013.01); *B63B 79/10* (2020.01); *B63B 79/40* (2020.01); *F16K 37/0025* (2013.01); *B63B 2043/006* (2013.01)

(58) Field of Classification Search
CPC ... F16K 37/0025; F16K 31/046; B63B 79/40; B63B 79/10
See application file for complete search history.

(56) References Cited

U.S. PATENT DOCUMENTS

| | | |
|---|---|---|
| 3,757,317 A | 9/1973 | Kahn et al. |
| 4,563,780 A | 1/1986 | Pollack |
| 5,439,019 A | 8/1995 | Quandt et al. |
| 5,769,120 A | 6/1998 | Laverty, Jr. et al. |
| 5,975,124 A | 11/1999 | Stevens, II |

(Continued)

OTHER PUBLICATIONS

International Search Report dated Apr. 20, 2018, Application No. PCT/US17/66994, 12 pages.

*Primary Examiner* — Peter D Nolan
*Assistant Examiner* — Luke Huynh
(74) *Attorney, Agent, or Firm* — Rankin, Hill & Clark LLP

(57) ABSTRACT

According to one aspect, a master control module controlling multiple valve assemblies on a marine vessel may include a receiver, an input component, a processor, and a transmitter. The receiver may receive positional status signals from corresponding individual control modules. Each positional status signal may be indicative of a positional status of a valve assembly corresponding to a respective individual control module. The input component may receive a command pertaining to one or more of the valve assemblies, including a desired flow characteristic and/or a desired time. The processor may generate control signals for the valve assemblies in accordance with the desired flow characteristics. The transmitter may transmit the control signals to the respective individual control modules to effectuate the desired flow characteristic accordingly.

20 Claims, 15 Drawing Sheets

(56) References Cited

U.S. PATENT DOCUMENTS

| | | |
|---|---|---|
| 6,173,727 B1 | 1/2001 | Davey |
| 6,206,340 B1 | 3/2001 | Paese et al. |
| 6,286,532 B1 | 9/2001 | van Nieuwstadt et al. |
| 6,337,635 B1 | 1/2002 | Ericksen et al. |
| 6,956,486 B2 | 10/2005 | King, Jr. |
| 7,218,237 B2 | 5/2007 | Kates |
| 7,228,874 B2 | 6/2007 | Bolderheij et al. |
| 7,438,080 B2 | 10/2008 | Johnson |
| 7,661,380 B2 | 2/2010 | Waldecker |
| 7,784,490 B1 | 8/2010 | Stewart et al. |
| 8,162,236 B2 | 4/2012 | Rodenbeck et al. |
| 8,201,572 B2 | 6/2012 | Segal |
| 8,820,342 B2 | 9/2014 | Do et al. |
| 8,843,241 B2 | 9/2014 | Saberi et al. |
| 2005/0082503 A1 | 4/2005 | Patterson et al. |
| 2006/0212134 A1 | 9/2006 | Dhawan |
| 2008/0156121 A1* | 7/2008 | Radomsky .......... F16K 37/0083 137/554 |
| 2008/0223951 A1 | 9/2008 | Tracey et al. |
| 2008/0230623 A1 | 9/2008 | Macnow et al. |
| 2009/0302249 A1 | 12/2009 | Fincher |
| 2010/0082132 A1 | 4/2010 | Marruchella |
| 2016/0251066 A1* | 9/2016 | Hiroshima ................ B63H 3/02 701/21 |
| 2016/0341333 A1* | 11/2016 | Podpaly .............. F16K 37/0058 |
| 2016/0342161 A1 | 11/2016 | Allen et al. |

* cited by examiner

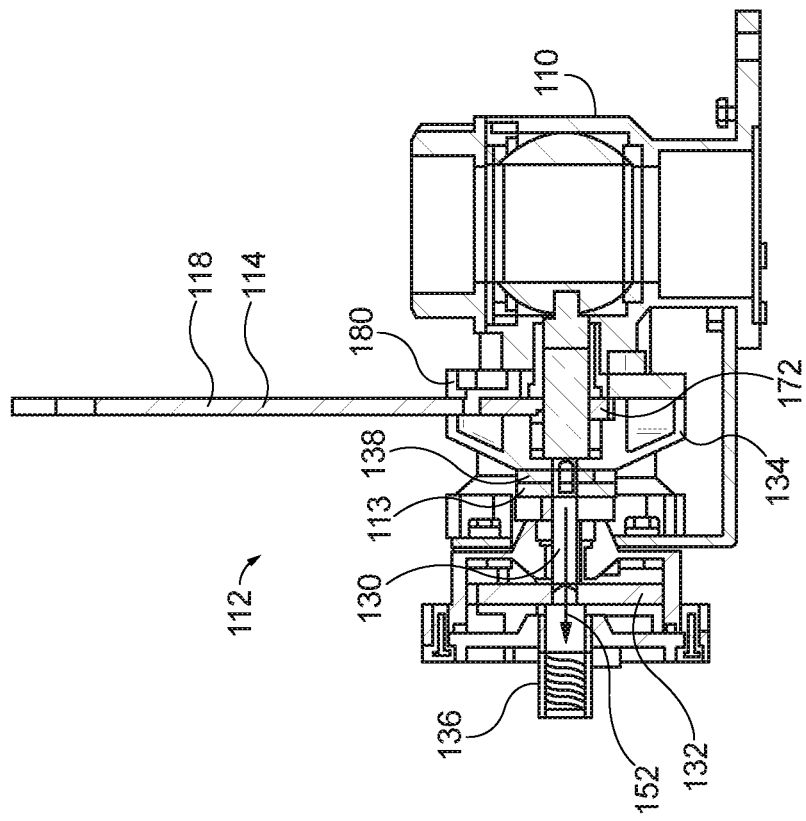
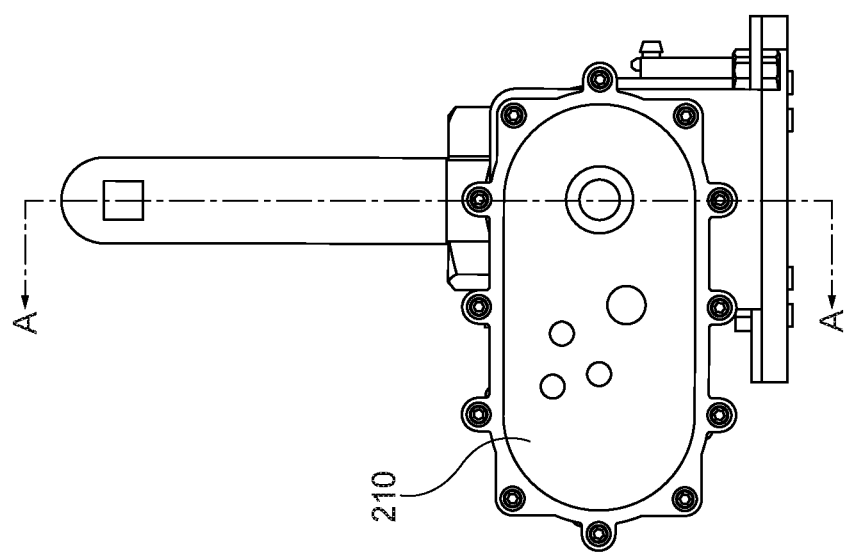
FIG. 1B
FIG. 1A

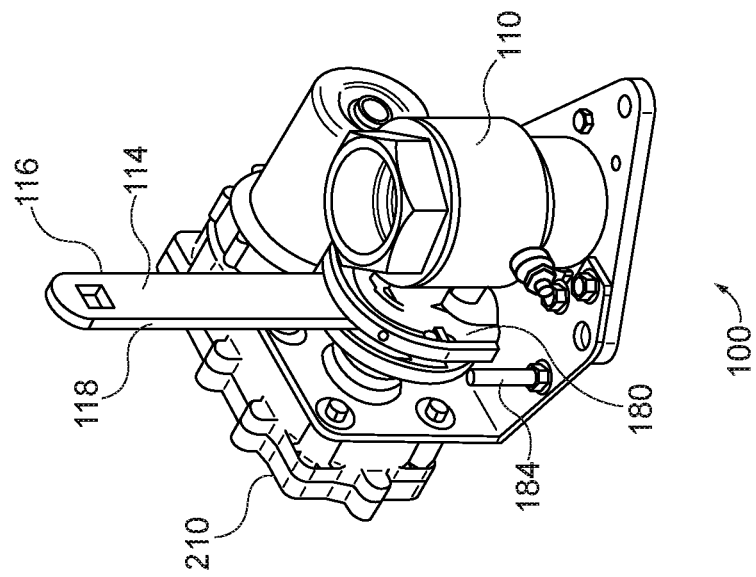
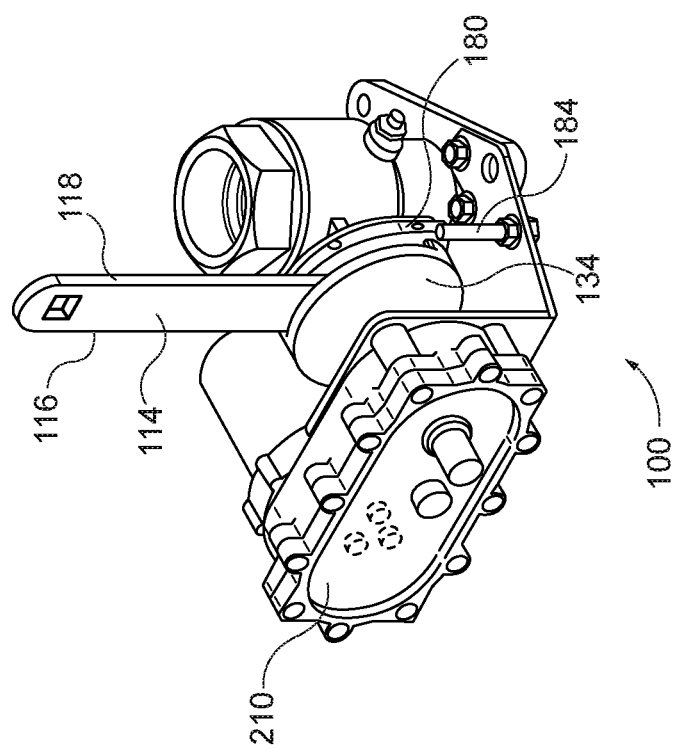
FIG. 3B
FIG. 3A

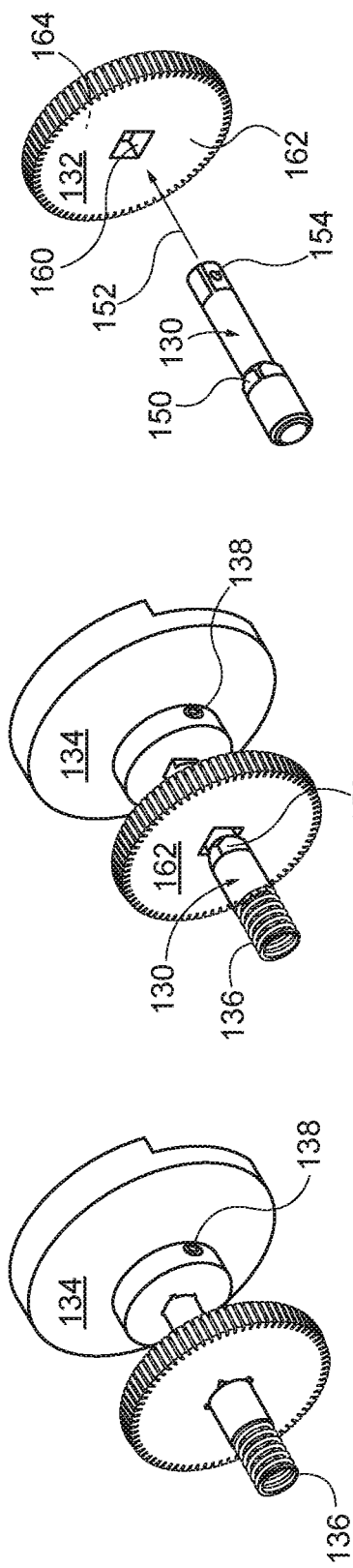

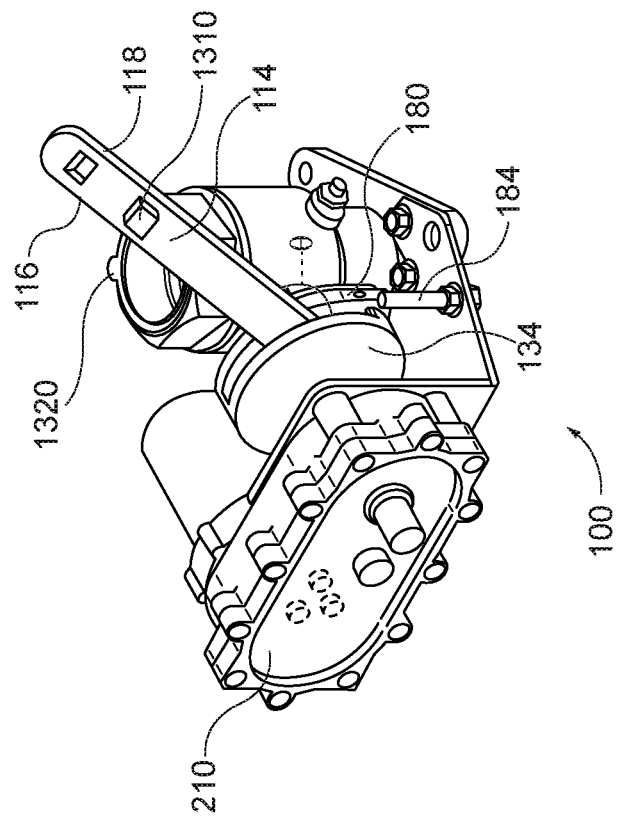
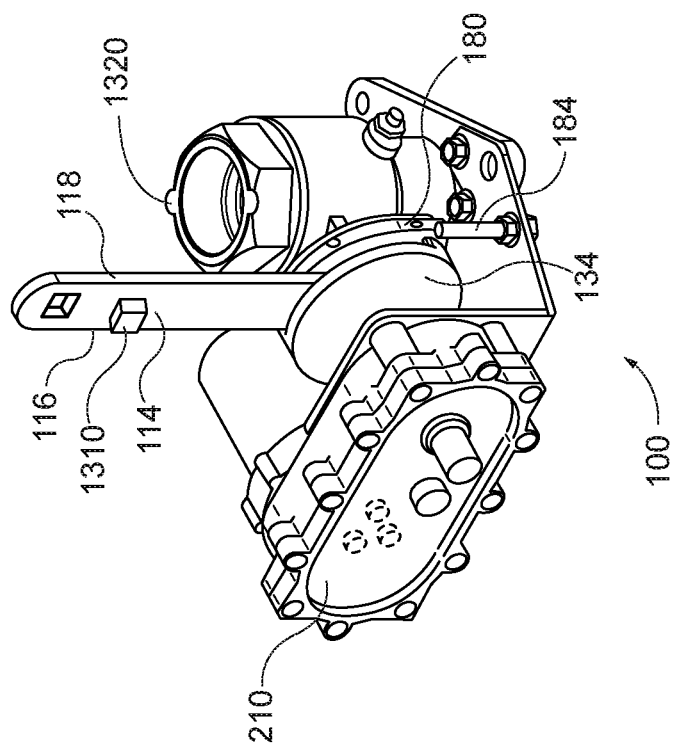

ELECTRIC VALVE INCLUDING MANUAL OVERRIDE

CROSS-REFERENCE TO RELATED APPLICATIONS

This application is a continuation-in-part (CIP) of and claims priority to U.S. Non-Provisional patent application Ser. No. 16/568,699 entitled "ELECTRIC VALVE INCLUDING MANUAL OVERRIDE", filed on Sep. 12, 2019, which is a continuation-in-part (CIP) of U.S. Non-Provisional patent application Ser. No. 15/381,849 entitled ELECTRIC VALVE INCLUDING MANUAL OVERRIDE, filed on Dec. 16, 2016, now issued as U.S. Pat. No. 10,473,227; the entirety of the above-noted application(s) is incorporated by reference herein.

BACKGROUND

Electrically actuated valves are very popular; opening a closed valve or closing an open valve with the touch of a button from a remote location has long been convenient and desirable. As a result, valves including motor drives have long been used in manufacturing and in the marine industry, and in other application areas to provide mechanical power where valve actuation by human power was inconvenient or impossible, and remote operation thereof.

It has long been recognized that an electrically operated valve must have a manual override capability, but the methods for achieving manual operation are not intuitive, and the procedure is physically difficult, time consuming, and often requires the use of tools. Furthermore, in a system that includes multiple valves, often in multiple sizes, such as on a marine vessel, monitoring and controlling the valves presents additional challenges to the designer and operator alike.

A common problem with valves in the marine industry has been the accumulation of nuisance growth on internal valve parts, making infrequently actuated valves extremely difficult to operate. Frequent valve actuation is the best method for minimizing growth buildup, but doing so has not been practical or convenient. Another common problem with valves in the marine industry is that as a vessel's speed increases or decreases, flow and pressure through the valve may change dramatically. Appropriate pressure and flow through a valve while the vessel is stationary may be inappropriate when the vessel travels at various speeds. Manually adjusting or "trimming" valves partially open to maintain appropriate pressure and flow is inconvenient.

Flow of water flow into various systems installed on a marine vessel passes through a fitting that penetrates the hull of the vessel. The fitting often is shaped to direct positive flow into the system plumbing, and as vessel speed increases, so does water flow. Conversely, as vessel speed decreases, so does water flow through the valve. Optimum performance of on-board systems is often contingent upon the system receiving an ideal rate of water flow through the valve; systems may perform poorly or fail all-together if either excess flow or inadequate flow is provided. Maintaining ideal flow through a valve requires manual manipulation of the valve handle and is inconvenient and therefore likely to be neglected.

In marine vessels, the presence of excess water in the bilge area is problematic and dangerous. There are numerous methods of alerting the vessel operator to the condition, but none identify the exact location of the high water in the vessel. It may be desirable to close all valves, or to close specific valves if an on-board fire suppression system is activated. Fire suppression systems are common on boats or marine vessels. For example, a fire suppression system may include a pressurized canister of retardant that is released in the event of an engine room fire.

Engine compartments on marine vessels may be equipped with fire suppressions systems that react to the presence of an on-board fire by discharging fire retardant chemicals. In the event of an on-board fire, as a safety precaution, it may be desirable to close all valves, or to close some valves to prevent the flow of water into the vessel or to stop the flow of engine fuel.

BRIEF DESCRIPTION

According to one or more aspects, a valve assembly including a manual override includes a valve body, an actuation cam, a shaft, a gear, and a biasing member. The actuation cam selectively engages the valve handle. The shaft is connected to the actuation cam and includes a projection and delineates an axis. The gear defines an opening which selectively receives the projection of the shaft to engage the shaft to the gear. The biasing member biases the shaft in a direction along the axis of the shaft towards the valve body. In a first operating condition of the valve assembly, the actuation cam is in an engaged position relative to the valve handle and the shaft is biased by the biasing member to be engaged with the gear. In a second operating condition of the valve assembly, the actuation cam is in a disengaged position offset along the axis of the shaft from the valve handle and at least partially rotated about the axis of the shaft such that the shaft is disengaged from the gear.

The valve assembly can include a valve handle pivotally mounted to the valve body to open and close the valve body. The actuation cam can include a first cam face and a second cam face. In the first operating condition of the valve assembly, the first cam face comes in contact with a first edge of the valve handle when the actuation cam is rotated in a first direction. In the second operating condition of the valve assembly, the second cam face comes in contact with a second edge of the valve handle when the actuation cam is rotated in a second direction.

According to one or more aspects, a master control module for controlling one or more valve assemblies includes a receiver, a display, an input component, a processor, and a transmitter. The receiver receives one or more positional status signals from one or more corresponding individual control modules. Each positional status signal is indicative of a positional status of a valve assembly of one or more valve assemblies corresponding to a respective individual control module of the one or more individual control modules. The display renders one or more graphic elements indicative of the positional status for the respective valve assemblies corresponding to the one or more individual control modules. The input component receives a command pertaining to one or more of the valve assemblies. The processor generates one or more sets of control signals for one or more of the valve assemblies associated with the command. The transmitter transmits the one or more sets of control signals to the one or more individual control modules.

According to one or more aspects, a method for controlling one or more valve assemblies can include receiving one or more positional status signals from one or more corresponding individual control modules, rendering one or more graphic elements indicative of the positional status for the respective valve assemblies corresponding to the one or more individual control modules, receiving a command pertaining to one or more of the valve assemblies, generating one or more sets of control signals for one or more of the valve assemblies associated with the command, and transmitting the one or more sets of control signals to the one or more individual control modules. Each positional status signal is indicative of a positional status of a valve assembly of one or more valve assemblies corresponding to a respective individual control module of the one or more individual control modules.

According to one or more aspects, a system for controlling one or more valve assemblies includes a receiver, a display, an input component, a processor, and a transmitter. The receiver receives one or more positional status signals from one or more corresponding individual control modules. Each positional status signal is indicative of a positional status of a valve assembly of one or more valve assemblies corresponding to a respective individual control module of the one or more individual control modules. The display renders one or more graphic elements indicative of the positional status for the respective valve assemblies corresponding to the one or more individual control modules. The input component receives a command pertaining to one or more of the valve assemblies. Commands include at least one of an open command, a close command, a lock command, an unlock command, or an automatic command. The processor generates one or more sets of control signals for one or more of the valve assemblies associated with the command. The transmitter transmits the one or more sets of control signals to the one or more individual control modules.

According to one aspect, a master control module controlling multiple valve assemblies on a marine vessel may include a receiver, an input component, a processor, and a transmitter. The receiver may receive one or more positional status signals from one or more corresponding individual control modules. Each positional status signal may be indicative of a positional status of a valve assembly of multiple valve assemblies corresponding to a respective individual control module of the one or more individual control modules. The input component may receive a command pertaining to one or more of the valve assemblies. The command may include a desired flow characteristic for one or more of the valve assemblies. The processor may generate one or more sets of control signals for one or more of the valve assemblies in accordance with the desired flow characteristic. The transmitter may transmit the one or more sets of control signals to the respective one or more individual control modules. One or more of the individual control modules may be configured to control a position of one or more of the corresponding valve assemblies based on one or more sets of the control signals. One or more of the individual control modules may be configured to receive the command via a switch and control the position of one or more of the corresponding valve assemblies based on the command from the switch. The processor may generate the one or more sets of control signals for the valve assemblies having an "unlocked" lock status and the transmitter may transmit the one or more sets of control signals to the respective individual control modules configured to control the position of the one or more of the corresponding valve assemblies having the "unlocked" lock status.

The desired flow characteristic may be a percentage, a volume, a mass, or a density across time. The command may include a desired time or time window at which the desired flow characteristic is desired to be achieved. Each positional status signal for each corresponding individual control module may be received from a position sensor associated with the corresponding individual control module indicative of an angle associated with a handle of the corresponding valve assembly. The processor may generate one or more of the sets of control signals for one or more of the valve assemblies based on the angle of the handle of the corresponding valve assembly. The processor may record a transit time associated a change in the positional status of one or more of the valve assemblies of the multiple valve assemblies from an open position to a closed position or from the closed position to the open position. The processor may generate one or more of the sets of control signals for one or more of the valve assemblies based on the desired flow characteristic and a portion of the transit time.

The receiver may receive one or more flow monitor signals from one or more of the corresponding individual control modules. Each flow monitor signal may be indicative of a flow associated with a valve assembly of the multiple valve assemblies corresponding to respective individual control modules. The processor may generate the one or more sets of updated control signals for the valve assemblies having the "unlocked" lock status based on one or more of the flow monitor signals. The processor of the master control module may program the switch of one of more of the individual control modules to control the position of one or more of the corresponding valve assemblies based on the desired flow characteristic.

According to one aspect, a method for controlling one or more valve assemblies may include receiving, via a receiver, one or more positional status signals from one or more corresponding individual control modules, wherein each positional status signal is indicative of a positional status of a valve assembly of multiple valve assemblies corresponding to a respective individual control module of the one or more individual control modules, receiving, via an input component, a command pertaining to one or more of the valve assemblies, wherein the command includes a desired flow characteristic for one or more of the valve assemblies, generating, via a processor, one or more sets of control signals for one or more of the valve assemblies in accordance with the desired flow characteristic, transmitting, via a transmitter, the one or more sets of control signals to the respective one or more individual control modules, wherein one or more of the individual control modules is configured to control a position of one or more of the corresponding valve assemblies based on one or more sets of the control signals, wherein one or more of the individual control modules is configured to receive the command via a switch and control the position of one or more of the corresponding valve assemblies based on the command from the switch, wherein the processor generates the one or more sets of control signals for the valve assemblies having an "unlocked" lock status, and wherein the transmitter transmits the one or more sets of control signals to the respective individual control modules configured to control the position of the one or more of the corresponding valve assemblies having the "unlocked" lock status.

The desired flow characteristic may be a percentage, a volume, a mass, or a density across time. The command may include a desired time or time window at which the desired flow characteristic is desired to be achieved. Each positional status signal for each corresponding individual control module may be received from a position sensor associated with the corresponding individual control module indicative of an angle associated with a handle of the corresponding valve assembly. The method may include generating one or more of the sets of control signals for one or more of the valve assemblies based on the angle of the handle of the corresponding valve assembly. The method may include recording a transit time associated a change in the positional status of one or more of the valve assemblies of the multiple valve assemblies from an open position to a closed position or from the closed position to the open position and generating one or more of the sets of control signals for one or more of the valve assemblies based on the desired flow characteristic and a portion of the transit time.

The method may include receiving one or more flow monitor signals from one or more of the corresponding individual control modules, wherein each flow monitor signal may be indicative of a flow associated with a valve assembly of the multiple valve assemblies corresponding to respective individual control modules. The method may include generating the one or more sets of updated control signals for the valve assemblies having the "unlocked" lock status based on one or more of the flow monitor signals.

According to one aspect, a master control module controlling multiple valve assemblies on a marine vessel may include a receiver, an input component, a processor, and a transmitter. The receiver may receive one or more positional status signals from one or more corresponding individual control modules, wherein each positional status signal may be indicative of a positional status of a valve assembly of multiple valve assemblies corresponding to a respective individual control module of the one or more individual control modules. The input component may receive a command pertaining to one or more of the valve assemblies. The command may include a desired flow characteristic and desired time for one or more of the valve assemblies. The processor may generate one or more sets of control signals for one or more of the valve assemblies in accordance with the desired flow characteristic of the command. The transmitter may transmit the one or more sets of control signals to the respective one or more individual control modules. One or more of the individual control modules may be configured to control a position of one or more of the corresponding valve assemblies based on one or more sets of the control signals. One or more of the individual control modules may be configured to receive the command via a switch and control the position of one or more of the corresponding valve assemblies based on the command from the switch.

It may be desirable to select an ideal flow rate to optimize the performance of a plumbing system. Flow rate increases or decreases as the vessel speed changes, so by selecting a desired flow rate, the central valve control can command each valve to increase or decrease its open percentage according to GPS speed, by actual flow through the valve, or by valve handle position.

A master control module for controlling multiple valve assemblies on a marine vessel may include a receiver, a processor, and a transmitter. The receiver may receive one of a global positioning system (GPS) vessel speed or a thermal signal from a thermal sensor. The processor may generate one or more sets of control signals for commanding one or more valve assemblies based on the GPS vessel speed or the thermal signal. The transmitter may transmit the one or more sets of control signals to one or more individual control modules. One or more of the individual control modules may be configured to control a position of one or more of the corresponding valve assemblies based on one or more sets of the control signals.

The processor may receive a speed signal from the vessel GPS system, and may generate one or more sets of commands to one or more individual valve control modules to adjust the valve handle position to be partially closed or partially open in order to maintain the pre-selected ideal flow rate through the valve. Additionally, as vessel speed increases or decreases, the changing GPS speed signal may be used to continually "trim" one or more valves to maintain ideal flow.

The processor may receive a signal from an on-board fire suppression system indicating that it has discharged its chemical fire retardant, or from a thermal switch. The processor may be programmed to generate a close command to all valves or to a pre-selected set of valves.

BRIEF DESCRIPTION OF THE DRAWINGS

FIG. 1A is a front view of a valve assembly including a manual override in a first operating condition, according to one embodiment.

FIG. 1B is a cross-sectional view of the valve assembly in the first operating condition along the line A-A.

FIGS. 3A-3B are perspective views of the valve assembly of FIGS. 1A-1B.

FIGS. 4A-4E are illustrations of the manual override portion of the valve assembly of FIGS. 1A-1B.

FIGS. 13A-13C are perspective views of the valve assembly of FIGS. 1A-1B in various operating conditions.

DETAILED DESCRIPTION

Figure 2B:
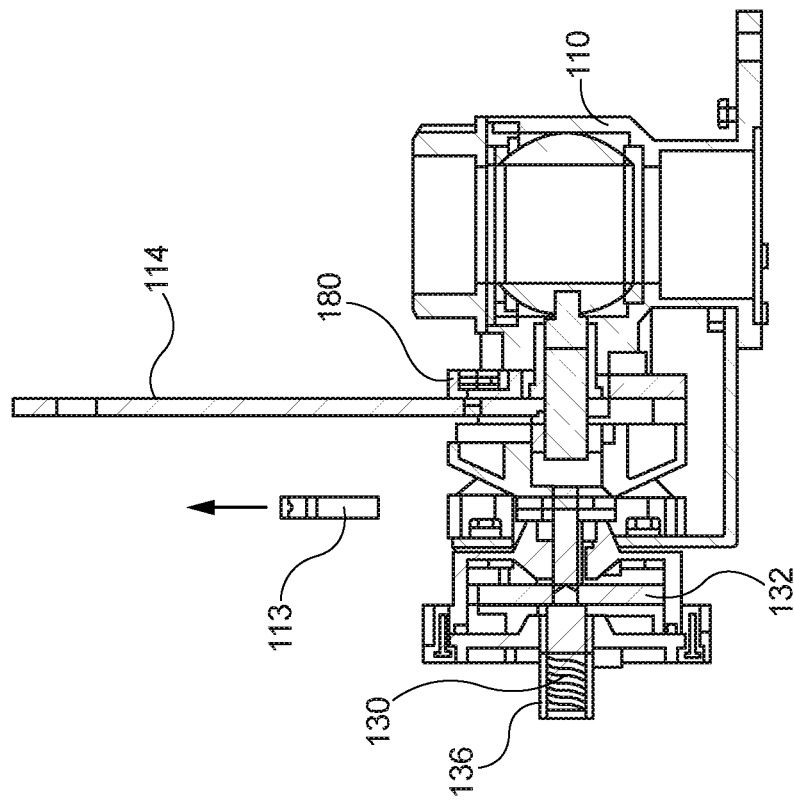
FIG. 2B is a cross-sectional view of the valve assembly of FIG. 2A in a second operating condition along the line A-A.
Figure 2A:
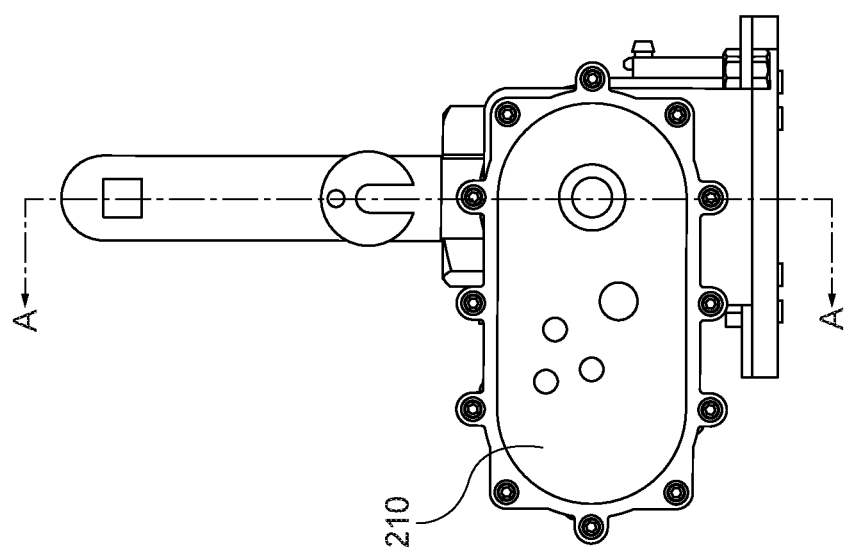
FIG. 2A is a front view of the valve assembly in a second operating condition, according to one embodiment.

With reference to FIGS. 1-10, an exemplary valve assembly 100 according to the present disclosure can include a valve body 110 and a manual override portion 112. The valve body 110 controls fluid flow while the manual override portion 112 enables the valve body 110 to be operated in at least two operating conditions. For example, in a first operating condition, the valve handle 114 can be driven electrically, such as by an electric motor or other drive mechanism. In a second operating condition, the valve handle 114 can be manually operated. This may be useful in a scenario where power is lost, for example. The ability to quickly open or close the valve assembly 100 by manually manipulating the valve handle 114 is advantageous for safe operation of vessel systems and for the overall integrity of a vessel. The manual override portion 112 can be set to the second operating condition manually and can be returned to the first operating condition either manually or electrically, as will be described in greater detail herein.

Although not depicted in the figures, the valve body 110 can include an aperture or an opening which allows fluid to flow therethrough and a seal element which toggles between an open position and a closed position. The valve body 110 houses the seal element, which is situated between seats of the valve body 110 and is connected to an actuation axle. The actuation axle is connected to a valve handle 114, which is adapted to be adjustable between an open position and a closed position. The valve handle 114 includes a first edge 116 and a second edge 118. It should be appreciated by one skilled in the art that movement of the valve handle 114 causes the seal element to move between the open position and closed position relative to the aperture. In this way, control of fluid flow can be achieved by rotation of the valve handle 114. Explained another way, the valve handle 114 is mounted to the valve body 110 such that the valve handle 114 is pivotable about an axis of the actuation axle to open and close the valve body 110.

In FIGS. 4A, 4B, and 4C, the manual override portion 112 includes a shaft 130, a gear 132, an actuation cam 134, a biasing member 136, and a fastening element 138. The shaft 130 is elongated, includes a projection 150, and rotates about an axis 152. The shaft 130 is connected to the actuation cam 134 by the fastening element 138 through an opening 154 in the shaft 130. The fastening element 138 can be a screw, a pin, or other type of fastener. Because the actuation cam 134 can selectively engage with the valve handle 114 and the valve handle 114 is connected to the actuation axle, an axis 152 of the shaft 130 and an axis of the actuation axle can be coaxial. The projection 150 of the shaft 130 can be rectangular or square in shape, although other shapes can be used.

The gear 132 defines an opening 160. The opening 160 of the gear 132 extends from a first side 162 of the gear 132 through a second, opposite side 164 of the gear 132. The first side 162 of the gear 132 faces the biasing member 136. The second, opposite side 164 of the gear 132 faces the valve body 110. The opening 160 of the gear 132 has a corresponding shape similar in dimensions to the projection 150 of the shaft 130 and can mate with the shaft 130 via receipt of the projection 150 in the opening 160. For example, the projection 150 of the shaft 130 can have slightly smaller dimensions than the opening 160 to effectively engage or disengage with the opening 160 of the gear 132. Thus, the opening 160 defined by the gear 132 enables selective engagement with the projection 150 of the shaft 130.

In FIGS. 6A-6E, the actuation cam 134 is adapted to selectively engage the valve handle 114 and includes a first cam face 172 and a second cam face 170, which can be disposed at right angles to one another. The cam faces 170 and 172 of the actuation cam 134 can be shaped to facilitate engagement with other components. For example, in FIGS. 3A-3B, the actuation cam 134 is in an engaged position relative to the valve handle 114 of the valve body 110. Because the actuation cam 134 is shaped, and due to the proximity of the actuation cam 134 to the valve handle 114 when the actuation cam 134 is in the engaged position, rotation of the cam about the axis of the shaft 130 results in the first cam face 172 coming in contact with the first edge 116 of the valve handle 114 when the actuation cam 134 is rotated in a first direction. Conversely, when the actuation cam 134 is rotated in a second direction, the second cam face 170 comes in contact with the second edge 118 of the valve handle 114. Thus, the actuation cam 134 and the valve handle 114 are positioned with respect to one another such that the first cam face 172 and the second cam face 170 can be brought into contact with opposite edges 116, 118 of the handle as a result of rotation of the actuation cam 134 while the valve assembly 100 is in the first operating condition.

Figure 7C:
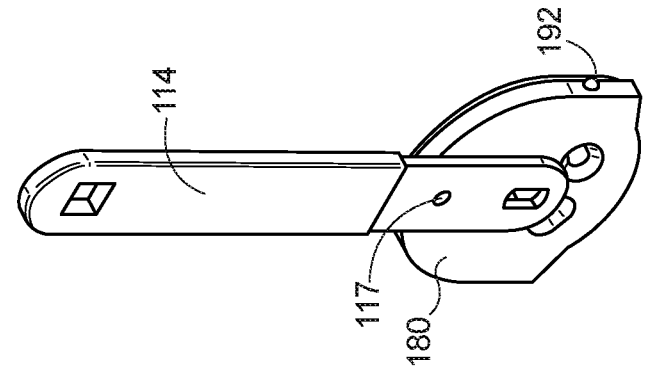
FIGS. 7A-7C are illustrations of position sensing and water sensing components of the valve assembly of FIGS. 1A-1B.
Figure 7B:
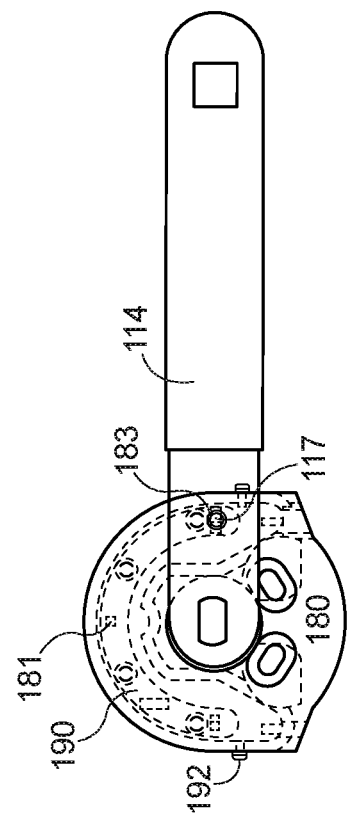
Figure 7A:
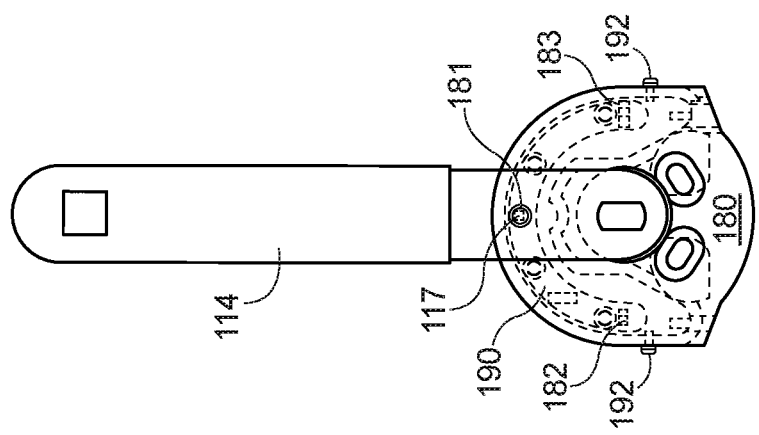

FIG. 7A (in partial phantom view) shows a magnet 117 disposed in the valve handle 114 and aligned with a position sensor 181 of the housing 180. As shown in FIG. 7A, the valve handle 114 is vertical relative to the housing 180, resulting in the valve aperture being open. Conversely, FIG. 7B shows the magnet 117 in the valve handle 114 aligned with a different position sensor 183 of the housing 180, which defines the valve handle 114 to be horizontal relative to the housing 180. Thus, the valve aperture is determined to be closed (e.g., based on the alignment of the magnet 117 with the position sensor 183). FIG. 7C is a perspective view of FIG. 7A.

There are two methods by which the valve can be manually operated. During normal operation, when power is available, following completion of an "open valve" or "close valve" command, the individual control module 220 returns the actuation cam 134 to a "ready position" shown in FIG. 6A (open ready position), or FIG. 6E (closed ready position). In this way, the 90-degree "L" shaped opening of cam 134 (created by the faces 170 and 172 shown in FIG. 6C) allows the valve handle 114 to be manually operated at any time.

Conversely, in the second operating condition of the valve assembly 100, shown in FIG. 2B and FIG. 4E, the key 113 is removed and the actuation cam 134 is in a disengaged position, offset from the valve handle 114 along the axis of the shaft 130 and rotationally oriented about the axis of the shaft 130 such that the shaft 130 is disengaged from the gear 132. When the shaft 130 is disengaged from the gear 132, the projection 150 of the shaft 130 can contact or rest on the first side 162 of the gear 132, facing the biasing member 136. The actuation cam 134 and the shaft 130 are connected by the fastening element 138 and move as a unit relative to the gear 132, which remains stationary in either of the operating conditions.

Because the actuation cam 134 and the shaft 130 move as a unit, disengaging the actuation cam 134 from the valve body 110 or the valve handle 114 results in the projection 150 of the shaft 130 disengaging from the opening 160 of the gear 132. In this manner, the valve handle 114 can be operated manually, to rotate in either direction to a desired position (e.g., the open position or the closed position) in a manual fashion while the valve assembly 100 is in the second operating condition. This can be achieved when the user removes the key 113, and pulls the actuation cam 134 away from the valve body 110 towards the biasing member 136, overcoming a biasing force, and rotates the valve handle 114 so that the projection 150 does not mate or engage with the gear 132 when the user releases the actuation cam 134. Rather, the projection 150 will contact or rest on the first side 162 of the gear 132 as a result of the biasing force from the biasing member 136. This can be seen more clearly in FIGS. 4B and 4C.

When the key 113 is removed and the actuation cam 134 is pulled away from the valve handle 114, the first and second edges 116, 118 of the valve handle 114 are repositioned (contrasted between FIG. 1B and FIG. 2B) such that the first cam face 172 and the second cam face 170 of the actuation cam 134 cannot be brought into contact with opposite edges 116, 118 of the valve handle 114 when the valve handle 114 is rotated, as seen in FIG. 2B. In this way, the user can change operation of the valve assembly 100 from the first operating condition to the second operating condition without making other prior adjustments and without requiring the use of tools or disengagement of a drive mechanism from the valve assembly 100.

With the second method, if power is lost during an open valve or a close valve operation, the actuation cam 134 stops in the position it was in at the time power was lost (e.g., diagonal, halfway between open and closed), and is not in the "ready position". In this case, manual operation would not be possible. To allow manual operation in both directions, an override procedure described herein is conducted.

The biasing member 136 biases the shaft 130 in a direction along the axis of the shaft 130 toward the valve body 110. A key 113 engages shaft 130 axially to assure engagement between shaft projection 150 and gear opening 160. In one embodiment, the biasing member 136 is a spring. Therefore, in the first operating condition of the valve assembly 100, shown in FIGS. 4A and 4D, the actuation cam 134 is in the engaged position relative to the valve body 110 and held in place because the shaft 130 is biased by the biasing member 136 to be engaged with the gear 132. In other words, the biasing member 136 and the key 113 hold the projection 150 of the shaft 130 in the engaged position within the opening 160 of the gear 132. This can be seen more clearly in FIG. 4A.

In one embodiment, the gear 132 can be a portion of a gear assembly including multiple gears, such as reduction gears which are arranged to provide reduction gearing to match the rotational speed and torque of the drive mechanism to a desired actuation speed and force.

FIGS. 4A-4E are illustrations of the manual override portion 112 of the valve assembly 100, according to one embodiment. In the exemplary embodiment depicted in FIGS. 4B, 4C, and 4E, the shaft 130 has a projection 150 which is square and is adapted to engage the square opening 160 in the gear 132 and is disengaged from the gear 132. When power is applied by the drive mechanism to the shaft while the projection 150 of the shaft 130 is disengaged from the gear 132, the shaft rotates and the biasing member 136 causes the projection 150 to mate with the opening 160 of the gear 132, as depicted in FIG. 1B and FIG. 4D. In this way, the valve assembly 100 can be automatically placed into the first operating condition from the second operating condition by activating the drive mechanism. According to one aspect, a controller or control module, such as the individual control module 220 or the master control module 230, may control the valve assembly 100 to operate in the first operating condition based on a received thermal signal.

Because the projection 150 of the shaft 130 of FIG. 4C is square, rotation of the shaft 130 by the drive mechanism and biasing from the biasing member 136 will cause the shaft 130 to re-engage the gear 132 in 90-degree increments. It will be appreciated that other shapes can result in larger or smaller degree re-engaging increments.

It will be appreciated that the valve assembly 100 can be placed into the first operating condition from the second operating condition by manually rotating the actuation cam 134 such that the projection 150 of the shaft 130 is in alignment with the opening 160 of the gear 132. The biasing member 136 applies the biasing force to the shaft 130, pushing the shaft 130 and projection 150 into the engaged position (and similarly, the actuation cam 134 and the valve body 110 or valve handle 114 into the engaged position). Either way, the biasing member 136 provides the biasing force to enable re-engagement from the second operating condition into the first operating condition.

In both embodiments, counter-clockwise rotation of the valve handle 114 causes the valve body 110 to open and clockwise rotation of the valve handle 114 causes the valve body 110 to close. In other embodiments, clockwise rotation of the valve handle 114 causes the valve body 110 to open and counter-clockwise rotation of the valve handle 114 causes the valve body 110 to close. In one embodiment, the valve assembly 100 is open when the valve handle 114 is in a vertical position and closed when the valve handle 114 is in a horizontal position with respect to the valve body 110.

Additionally, the valve assembly 100 can include a housing 180 (shown in FIGS. 3B and 7A) and one or more position sensors 181, 182, and 183. For example, the position sensors 182 and 183 (shown in FIG. 7A) can determine when the valve handle 114 is rotated to a horizontal, closed position in contact with a hard stop 184 (shown in FIG. 3B). According to one aspect, a current sensor 190 senses an amount of current drawn by a drive mechanism 210 (shown in FIG. 5) and determines whether the valve handle 114 is fully actuated to a horizontal or closed position such that one of the edges 116 or 118 of the valve handle 114 is in contact with the hard stop 184. The position sensor 181 determines when the valve handle 114 is in the vertical (open) position relative to the housing 180. The valve assembly 100 can include sensors, such as the current sensor 190 (shown in FIG. 7A) which provides motor current signals indicative of a position of the valve handle 114 against the hard stop 184 or a failure of the drive mechanism. Other examples of sensed parameters include voltages (e.g., associated with a battery level, the presence of high water), torque, force, etc. associated with any of the components disclosed herein.

With reference to FIGS. 7A-7C, water level sensors 192 are used to detect a high water level when water is in contact with two or more (or both) of the water level sensors 192. When the water is at this level (e.g., higher than both of the water level sensors 192), an electrical path is established between the two or more water level sensors 192, thereby completing a circuit. This circuit causes transmission of a water level status signal to initiate an alert that there is a high water condition at that particular valve assembly location.

Figure 5:
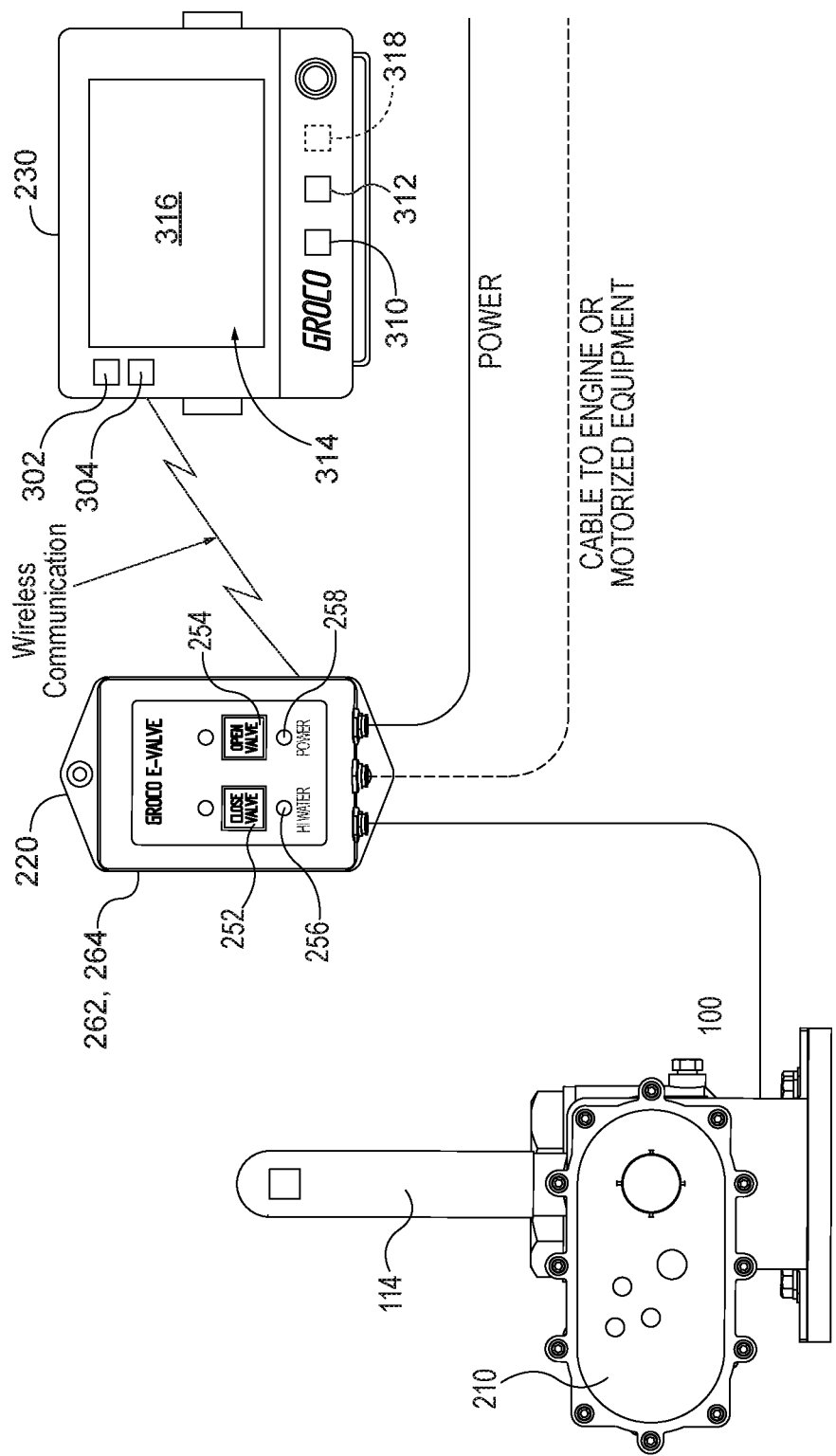
FIG. 5 is a component diagram of a system for maintaining and operating valve assemblies, such as the valve assembly of FIGS. 1A-1B.

FIG. 5 is a component diagram of a system for controlling, maintaining, and operating one or more valve assemblies, according to one embodiment. The system can include a number of valve assemblies, drive units, individual control modules, and a master control module 230. However, for the sake of explanation merely one valve assembly 100, drive mechanism 210 or unit (also shown in FIGS. 3A-3B), individual control module 220, and master control module 230 are described. In one embodiment, any number of the valve assemblies can be configured similarly to the valve assembly 100 of FIG. 1B.

The individual control module 220 is a stand-alone module which allows for local operation of a single corresponding valve assembly 100. For example, the individual control module 220 includes buttons or switches which allow a user to open or close the corresponding valve assembly 100. When pressed, these buttons cause the individual control module 220 to provide or transmit a control signal to the drive mechanism 210 or unit to either open or close the corresponding valve assembly 100. The drive mechanism 210 or unit is coupled to the valve handle 114 and is electrically driven by a control signal from the individual control module 220 or the master control module 230. In one embodiment, the individual control module 220 includes two membrane switches 252, 254 and two, three, or four light emitting diodes (LEDs). One of the membrane switches 254 opens the corresponding valve assembly 100 when pressed, while the other membrane switch 252 closes the valve assembly 100. When the valve assembly 100 is open the LED above the membrane switch 254 of the individual control module 220 is green. Conversely, when the valve assembly 100 is closed, the LED above the membrane switch 252 of the individual control module 220 is red. A flashing green or flashing red LED indicates the valve assembly 100 is in transit toward the commanded (open or close) position. A blue LED 256 indicates a high water condition specific to the valve location and a yellow LED 258 indicates that power is supplied and that the fuse is intact.

Further, the individual control module 220 includes circuitry which receives one or more status signals from different sensors of the valve assembly 100, such as water level status signals and positional status signals. Based on these signals, the individual control module 220 can display at least some of the status information associated with the valve assembly 100, such as whether the valve assembly 100 is open or closed, the presence of a high water condition at the location of the corresponding connected valve assembly 100, and the presence of power. The circuitry of the individual control module 220 can include a transmitter 262 and a receiver 264 or a transceiver which enables communication between the individual control module 220 and the master control module 230 as well as communication between the individual control module 220 and the corresponding valve assembly 100.

The master control module 230 is optional and can communicate with a plurality of individual control modules and is capable of doing so wirelessly or in a wired fashion. Similarly to the individual control module 220, the master control module 230 can include a transmitter 302 and a receiver 304 or a transceiver. In this way, the master control module 230 can transmit commands to different individual control modules or receive status information from individual control modules. The use of transceivers enables the master control module 230 to be located remote from the individual control modules and corresponding valve assemblies. For example, the master control module 230 can be located at the helm of the vessel, the individual control module 220 can be located in an engine room, and the valve assembly 100 can be located on the hull of the vessel. In this way, the transmitter 302 can transmit sets of control signals to individual control modules in a wireless fashion.

In any event, the individual control module 220 can relay signal information from the valve assembly 100 to the master control module 230, which can be used as a platform to manage all of the valve assemblies of the vessel. The master control module 230 can include the transmitter 302 and receiver 304 or transceiver, a processor 310, a memory 312, an input component 314, a display 316, and an audio component 318 (e.g., a speaker or horn).

The master control module 230 can, at a glance, provide status information for one or more detected valve assemblies, such as a positional status of the valve assembly 100. In one embodiment, the display 316 and the input component 314 are integrated as a single unit, in the form of a touchscreen. The input component 314 is a component which allows users to enter a command pertaining to one or more of the valve assemblies. In other embodiments, the master control module 230 can be implemented as a mobile device, such as an application installed on a smartphone or a tablet. The input component 314 can be configured to provide one or more options for one or more different commands to be entered. Upon selection of a respective command, the receiver 304 can gather status signals from different valve assemblies and have the processor 310 react accordingly (e.g., based on the selected command and/or one or more selected valves). Regardless, the commands received at the input component 314 can be transmitted (e.g., as control signals) to an appropriate group of valve assemblies (or associated drive units) through respective individual control modules.

The receiver 304 can receive the status signals from one or more corresponding individual control modules. Examples of status signals include lock status signals indicative of a lock status of the valve assembly 100, water level status signals, automatic status signals, etc. The positional status signal is indicative of a positional status of the valve assembly 100 of the detected valve assemblies corresponding to a respective individual control module of the individual control modules. The water level status signal is indicative of the water level associated with the valve assembly 100 and is received from the water level sensors 192 of the valve assembly 100.

Further, the master control module 230 can, at the command of the user, operate one or more selected valve assemblies by transmitting or receiving commands at the input component 314. The input component 314 can transmit or receive a command or user inputs pertaining to at least one of the valve assemblies. Examples of commands include "exercise all", "open all", "close all", "assign group", "select valve(s)", etc. In one embodiment, the master control module 230 can be similar or have an identical hardware configuration to the individual control module, except that it is configured to act as a hub or "master" with respect to the other individual control modules.

The processor 310 can generate one or more sets of control signals for the valve assemblies associated with the command. The transmitter 302 can transmit sets of control signals to selected individual control modules, which in turn, pass the control signals to corresponding valve assemblies. Examples of commands include selecting the valve assembly 100, assigning the valve assembly 100 to a group, opening, closing, locking, unlocking, or toggling the valve assembly 100. The display 316 can render graphic elements indicative of a status for any one of the respective valve assemblies based on the status signals received from the individual control module.

Setup Valve Assemblies

In one embodiment, the master control module 230 can be utilized to detect and setup the detected valve assemblies. For example, the memory 312 of the master control module 230 can access or store a selection of vessel plans, and allow the user to select the plan which is indicative of a layout of the vessel. Alternately, the user can "upload" a vessel plan of their choosing. As valve assemblies are added, an icon is rendered on the display 316. The master control module 230 offers a keyboard for the naming of each valve (i.e., PORT ENGINE, GENERATOR, etc.) and allows each valve icon to be placed by "drag and drop" in its relative location on the vessel plan shown on the display 316. In this manner, at the conclusion of the setup process, a vessel plan is shown with all valve assemblies named and located accurately, thereby enabling the user to view all valve assemblies aboard the vessel at a glance, corresponding operational and position status, and to command status and/or position changes.

Figure 8:
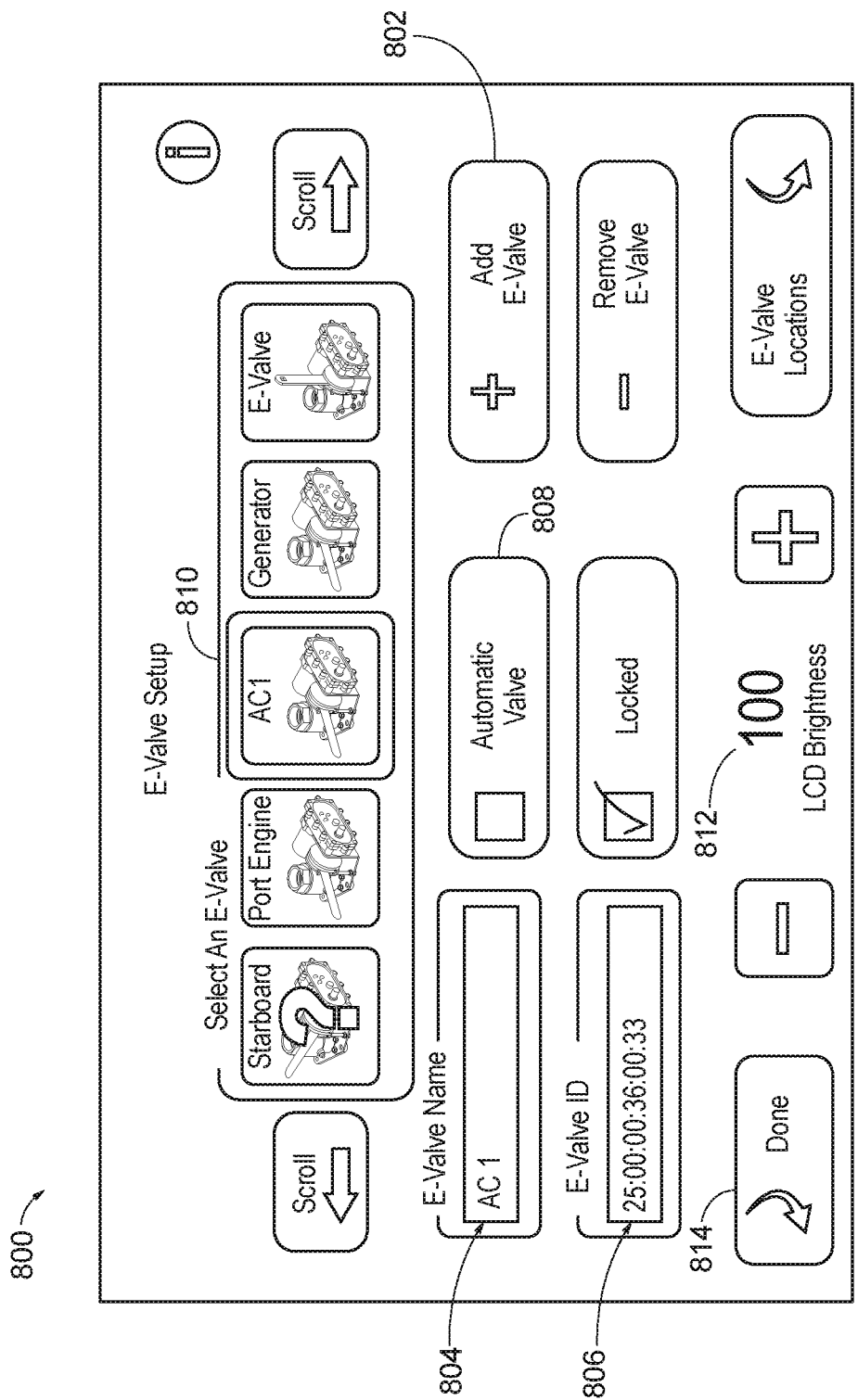
FIG. 8 is an illustration of an example interface rendered by the system of FIG. 5.

For example, as seen in FIG. 8, a menu or interface 800 can be displayed which includes a graphic element or an icon (e.g., a gear icon for setup), which when pressed or selected, enables the user to "Add an E-Valve" 802 or "Name an E-Valve" 804. Each valve assembly is uniquely identified and is individually addressed within the interface rendered by the display 316 (e.g., one graphic element is rendered for each valve assembly).

In one embodiment, the individual control module 220 assigns the valve assembly 100 a unique identification number 806. In other embodiments, each individual control module 220 comes with a pre-defined unique identification number, which is transmitted from the individual control module 220 to the master control module 230. The display 316 and input component 314 of the master control module 230 can be implemented to assign other types of information to the corresponding valve assembly, such as the location of the valve assembly in accordance with the vessel plan. Further, the input component 314 can assign an automatic status to a selected valve assembly through a graphic element 808 presented as a touchscreen option. When the selected valve assembly is designated with the automatic status, the valve assembly 100 is commanded by the processor 310 or individual control module 220 to open when an engine of the vessel is operating and to close when the engine ceases operation. Thus, the processor 310 can provide control signals to different or individual valve assemblies based on an operational status (e.g., engine active, engine inactive, vessel unattended, a failsafe condition, a water level, oil pressure, etc.) of the vessel.

In other embodiments, the display 316 can render a "find valve" interface which enables the user to utilize the input component 314 to enter a name or location associated with a valve assembly. The processor 310 can search for associated valve assemblies and have the display 316 render a list of results.

Status Display

Figure 9:
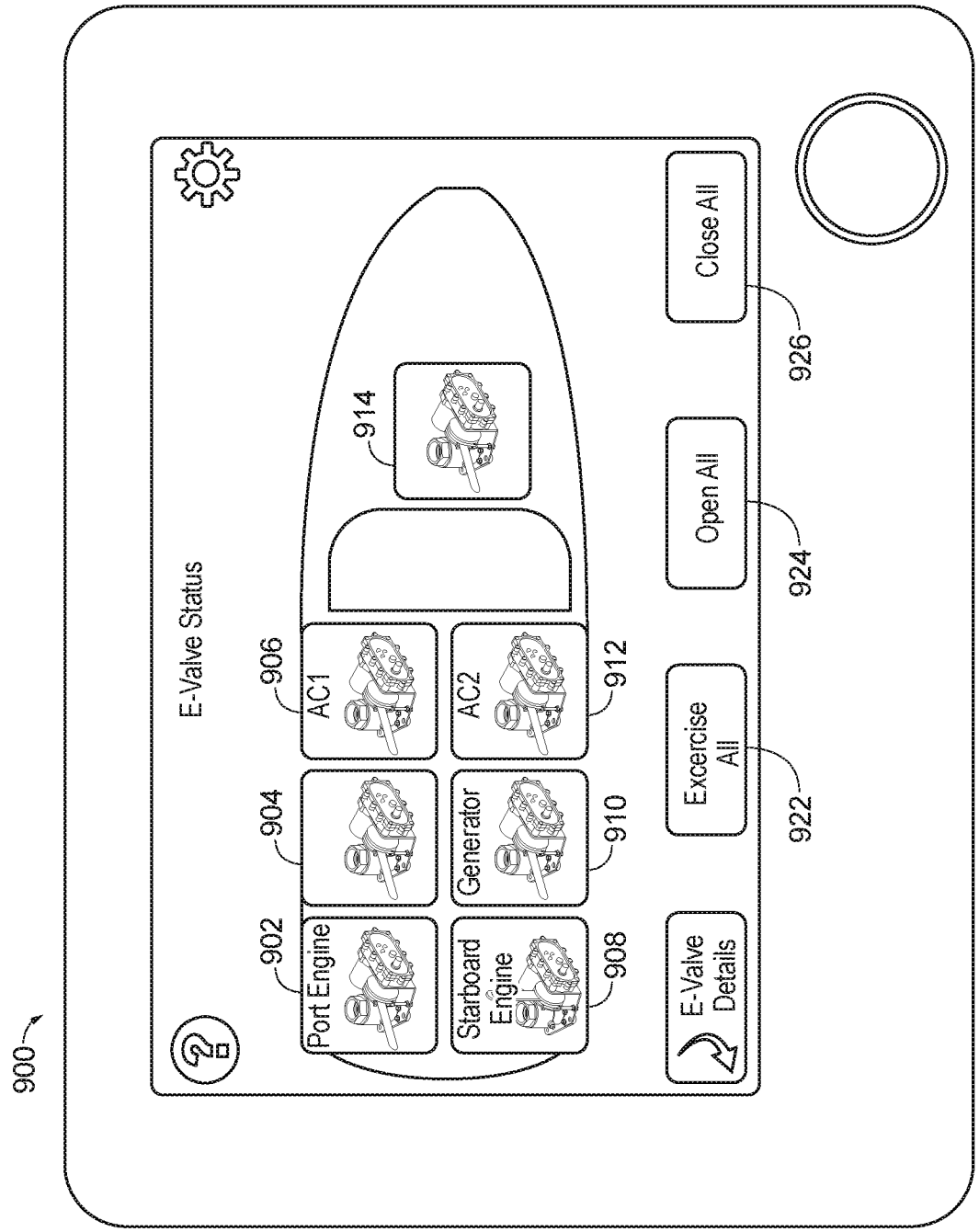
FIG. 9 is an illustration of an example interface rendered by the system of FIG. 5.

According to one aspect, when the user advances to a startup screen or a home screen, the display 316 can render graphic elements (902, 904, 906, 908, 910, and 912) indicative of the positional status and locations for the respective valve assemblies based on the positional status signals and identifiers received from the individual control module 220, as seen in FIG. 9. Further, the display 316 can render graphic elements indicative of the lock status for the valve assemblies based on the lock status signals received from the individual control modules. The display 316 can render different statuses in different colors and different operational statuses in different colors. For example, graphic elements can indicate the positional status of the corresponding valve assembly where a constant red color is indicative of the closed positional status and a constant green color is indicative of the open positional status. Blinking (or flashing) red or blinking green graphic elements mean that the valve assembly is in the process of closing or opening, respectively. The display 316 can provide a visual indication of the status of the valve assembly and a way to issue commands to the corresponding valve assembly, such as the graphic element 902, 904, 906, 908, 910, and 912, which are rendered as software icons or buttons, for example.

In an embodiment, a selected valve assembly icon can be rendered yellow in color. Thus, a group of selected valves would be displayed in yellow. In another embodiment, yellow is used to indicate that the valve assembly depicted is in automatic mode. Blue can be used to indicate that the valve assembly is locked. Orange can be used to indicate a problem with the corresponding valve assembly, such as a power failure, a jammed component, a blown fuse, etc.

Other status information can be rendered by the display 316 for each of the valve assemblies. Examples of status information include an operational state of the valve assembly, a function of the valve assembly, flow rate information (e.g., obtained from a flow meter or sensor on the valve assembly), positional status of the valve assembly, high water in a specific valve assembly location, and position of the valve according to the vessel plan.

Lock Valve

In one embodiment, the master control module 230 can lock one or more valves in the open position or the closed position. After confirming the valve is in the desired open or closed position, with reference to FIG. 8, a valve may be selected for locking by scrolling left or scrolling right until the desired valve assembly appears in the center position 810 of the set-up screen interface 800, identified by a white frame around the icon. When "locked" 812 is pressed the icon is displayed in a blue color and the "locked" box 812 displays a check mark. When "Done" 814 is pressed, master control module 230 commands actuation cam 134 to rotate 90-degrees counter-clockwise from the "Ready Position" to provide a mechanical lock of the valve handle 114 in the open (vertical) position. This is shown more clearly in FIGS. 6A-6B.

Similarly, the master control module 230 can lock one or more valves in the closed position. After confirming the valve is closed, referring to FIG. 8, a valve may be selected for locking by scrolling left or scrolling right until the desired valve assembly appears in the center position 810 of the set-up screen interface 800, identified by a white frame around the icon. When "locked" 812 is pressed the icon is displayed in a blue color and the "locked" box 812 displays a check mark. When "Done" 814 is pressed, master control module 230 commands actuation cam 134 to rotate 90-degrees clockwise from the "Ready Position" to provide a mechanical lock of the valve handle 114 in the open (horizontal) position. This is shown more clearly in FIGS. 6D-6E.

The master control module 230 can override the locked option and respond to the "Close All" command by closing valves that are locked open.

Exercise All

In one embodiment, the master control module 230 can be utilized to exercise all detected valve assemblies which are not associated with a "locked" lock status. A "valve exercise" is a command that cycles or toggles the valve assembly from its present (e.g., open or closed) position to the opposite position, and returns the valve to its original position. This may be done to a selected group of valve assemblies or a group of "all" valve assemblies (subject to the lock status). The display 316 can render the "exercise all" graphic element 922 at an interface 900 upon startup of the master control module 230 or universally across different interfaces as an option for the user. When the input component 314 receives the "exercise all" command, the processor 310 checks the lock status signals to determine which valve assemblies are locked and which valve assemblies are unlocked. The lock status signals are received by the receiver 304 from the corresponding individual control modules. The processor 310 determines a group of all of the valve assemblies having the "unlocked" lock status as the group which will be exercised. Within this group of valve assemblies having the "unlocked" lock status, the processor 310 issues a first set of control signals to a first subgroup, and a second set of control signals to a second subgroup.

Figure 6A:
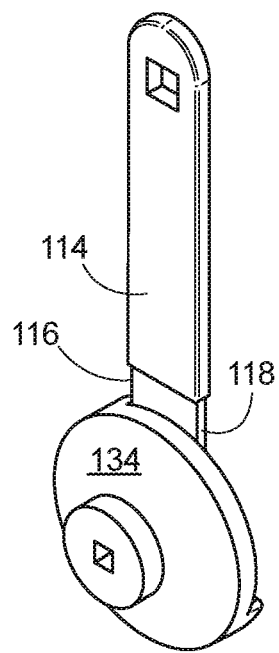
FIGS. 6A-6E are illustrations of a variety of handle positions of the valve assembly of FIGS. 1A-1B.
Figure 6B:
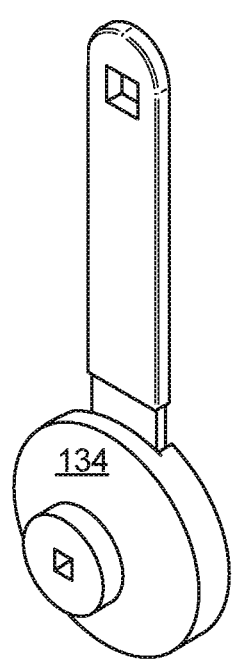
Figure 6C:
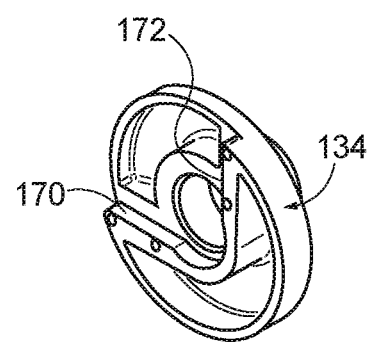
Figure 6D:
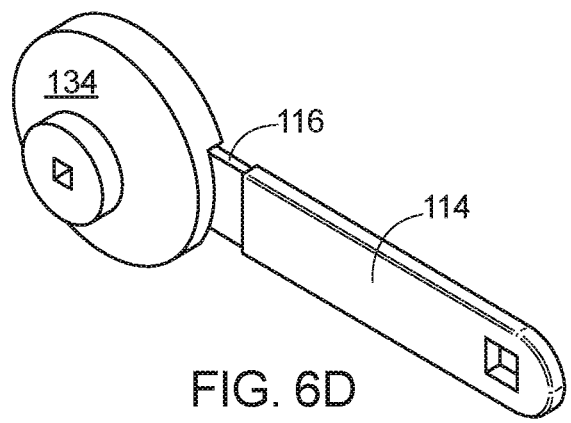
Figure 6E:
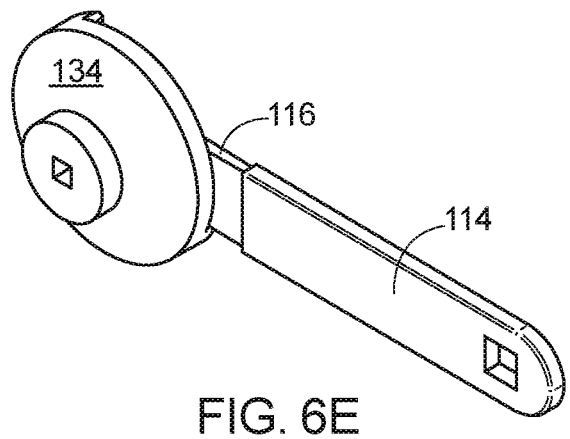

At the completion of each open or close command, the master control module 230 or the individual control module may command the actuation cam 134 to return to the ready position, as shown in FIGS. 6A and 6E.

The first subgroup is defined as a group of detected valve assemblies which has the "unlocked" lock status and also has the open positional status. For this first subgroup, the processor 310 generates a set of control signals to close these valve assemblies and subsequently re-open. The transmitter 302 transmits this set of control signals to the first subgroup of valve assemblies (e.g., the initial close command is transmitted, followed by the open command).

The second subgroup is defined as a group of detected valve assemblies which has the "unlocked" lock status and has the closed positional status. For this second subgroup, the processor 310 generates a set of control signals to open these valve assemblies and subsequently re-close.

In one embodiment, the transmitter 302 waits for a confirmation from the user prior to transmitting the corresponding exercise control signals to the first and second subgroups of valve assemblies. In other embodiments, "exercise all" can be automatically implemented by the processor 310 at startup or at one or more periodic time intervals, such as "Exercise once per week" (e.g., 168 hours) or "Exercise every day" (e.g., 24 hours). In this way, valve stiffness due to marine growth or corrosion can be mitigated.

Open All

In one embodiment, the master control module 230 can be utilized to open all detected valve assemblies which are not associated with a "locked" lock status. Similarly to the "exercise all" embodiment, merely the valve assemblies which have the "unlocked" lock status are provided with the open command. Thus, when the "open all" command is received at the input component 314 by a touch of the "open all" graphic element 924, the processor 310 checks the lock status signals to determine which valve assemblies are locked and which valve assemblies are unlocked and the positional status to determine the closed valve assemblies. The processor 310 determines a group of all of the valve assemblies having the "unlocked" lock status and the closed positional status as the group which will be exercised. In an embodiment, valve assemblies associated with an automatic status are excluded from this group. The processor 310 issues a set of control signals to this group to open the valve assemblies, and the transmitter 302 transmits the control signals accordingly.

Close All

The "Close All" command can be used as an emergency action. In one embodiment, the master control module 230 can be utilized to close all detected valve assemblies, regardless of the lock status of these valve assemblies. Unlike the other "exercise all" or "open all" embodiments, all the detected valve assemblies are provided with the close command. In other words, the "all" group for the "close all" command and the "all" group for the "exercise all" and "open all" command are not necessarily the same. Thus when the "close all" command is received via the "close all" graphic element 926 input component 314, the processor 310 issues a set of control signals to all detected valve assemblies having the open positional status to close, and the transmitter 302 transmits the control signals accordingly to respective individual control modules. In one embodiment, the display 316 renders a notification or a confirmation which requires user input or user confirmation before the transmitter 302 transmits the close command to the open valve assemblies.

Select, Deselect, and Group Valve Assemblies

In one embodiment, the master control module 230 can be utilized to select the detected valve assemblies. For example, the input component 314 can receive an assignment command assigning the selected valve assemblies to a group. An example of the assignment input could be a drag and drop operation. An example of a selection command could be a press and hold operation at the graphic element of an interface 900. Thus, groups of valve assemblies can be defined and addressed with a single command. When groups are created, the display 316 can render a graphic element for that group, which allows the user to lock, unlock, open, close, or provide other commands to that group. In this way, commands received by the input component 314 can pertain to the group of valve assemblies, rather than a single valve assembly.

Command Selected Valve Assemblies (Open, Close, Lock, Unlock, Exercise)

In one embodiment, the master control module 230 can be utilized to command selected valve assemblies. The display 316 can render one or more graphic elements which represent the valve assemblies or one or more groups of valve assemblies. Using the input component 314, the user can select a particular valve assembly or group of valve assemblies, such as by touching the corresponding graphic element on the display 316 or touchscreen. Depending on the status of the valve assembly, different options can be displayed.

In other words, the processor 310 receives positional signals (indicative of whether the valve assembly is open or closed) and automatic signals from each individual control modules 220, and locked or unlocked signals from master control module 230. Based on this status signal information, the processor 310 can cause the display to render available options.

For example, if the valve is in the "locked" lock status, an unlock option is rendered on the display 316. Thus, when the "unlock" command is received at the input component 314, the processor 310 assigns the "unlocked" lock status to the valve assemblies associated with this command (e.g., the selected valve assemblies).

Continuing on, if the valve is in the "unlocked" lock status, a lock option is rendered on the display 316. When the valve assembly has the "unlocked" lock status, that valve assembly is included in the "open all" and "exercise all" command group. However, when the valve assembly has the "locked" lock status, that valve assembly is not included in the "open all" and the "exercise all" command group. Stated another way, when the "lock" command is received at the input component 314, as applied to the selected valve assemblies, the processor 310 assigns the "locked" lock status to the valve assemblies which are selected. This means that further "exercise all" and "open all" commands to these locked valve assemblies (e.g., associated with the "locked" lock status) are ignored such that the positional status of the locked valve assemblies is maintained in their current positional states.

When the "locked" lock status is commanded for any valve, the individual control module 220 commands the actuation cam 134 to rotate 90-degrees away from the ready position to the "Open Locked" position (e.g., shown in FIG. 6B) or to the "Closed Locked" position (e.g., shown in FIG. 6D) for the purpose of affecting a "mechanical lock" of actuation cam 134 against the valve handle 114 of the valve assembly 100, thereby preventing unwanted manual or electric actuation of valve assembly 100. When the "locked" lock status is changed to "unlocked" lock status, the individual control module 220 commands actuation cam 134 to return 90-degrees to the "Ready Position", shown in FIG. 6A or FIG. 6E.

Conversely, the "close all" command results in all detected valve assemblies being closed, regardless of the lock status of the valve assembly.

Open and close command options are presented based on the current positional status of the valve assembly. The receiver 304 of the master control module 230 receives the status signals from the individual control module 220 (which receives the status signals from sensors of the valve assembly 100). These status signals can be received by the processor 310 and rendered as graphic elements on the display 316, thereby indicating to the user whether the valve assembly is locked, unlocked, open, closed, or in a transition between opening and closing.

At one screen or interface rendered by the display 316, the statuses of individual valve assemblies is rendered, illustrating for example, the positional status and the lock status of detected valve assemblies. When a specific valve assembly or group of valve assemblies is selected, the processor 310 determines available commands which are applicable to the selected valve assembly or group of valve assemblies, and the display 316 renders these available commands as different graphic elements. When one of the commands is selected by the user (e.g., via the input component 314), the processor 310 generates one or more sets of control signals which correspond to the selected command for the valve assemblies associated with the command (e.g., valve assemblies which are currently selected). The transmitter 302 transmits the sets of control signals to selected individual control modules, which pass the control signals to drive units of the corresponding valve assemblies. The display 316 can render graphic elements indicative of the status for the valve assemblies as the commands are executed.

Following the completion of an "open" or "close" command to the valve assembly, the individual control module 220 can generate a control signal which causes the drive unit 120 of the valve assembly to return the actuation cam 134 to a ready position, shown in FIGS. 6A and 6E.

Water Level Alert

In one embodiment, the master control module 230 can provide alerts pertaining to high water levels in a specific area of the vessel when the receiver 304 receives a water level status signal from the individual control module 220 which is indicative of a water level associated with the valve assembly being above a threshold level. As previously discussed, this can be achieved by having two or more water level sensors 192 which form a closed loop when the water level is high enough such that both water level sensors 192 are underwater. This electrical connection results in the sensors transmitting a water level status signal to the individual control module 220 and illuminate the blue LED 256 on the individual control module 220, which optionally passes the signal to the master control module 230. When the master control module 230 (optionally) receives this signal, the processor 310 can cause the display 316 to render a graphic element indicative of the high water level status for the corresponding valve assembly. Further, the processor 310 can command the audio component 318 to play an audio alert when the water level is greater than this threshold level. In certain scenarios, the processor 310 can also order all valves to be closed using a "close all" command when the threshold is exceeded.

Figure 10:
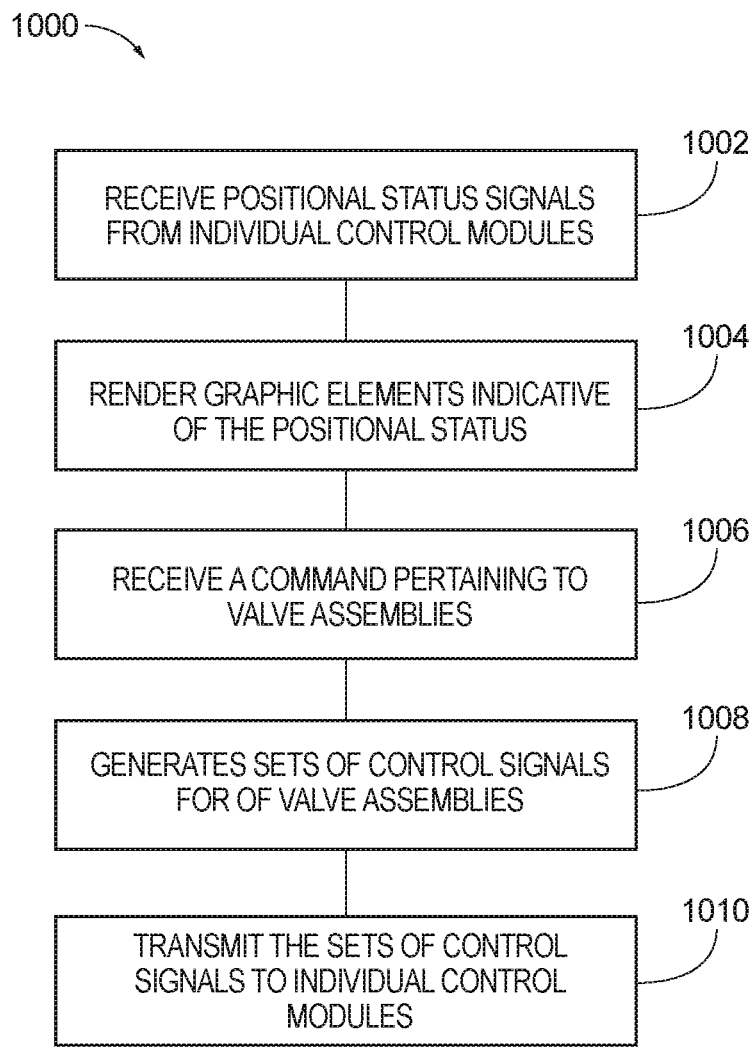
FIG. 10 is a flow diagram of a method for maintaining and operating valve assemblies, such as the valve assembly of FIGS. 1A-1B.

FIG. 10 is a flow diagram of a method 1000 for maintaining and operating valve assemblies, according to one embodiment. The method may include receiving one or more positional status signals from one or more corresponding individual control modules at 1002, rendering one or more graphic elements indicative of the positional status for the respective valve assemblies corresponding to the one or more individual control modules at 1004, receiving a command pertaining to one or more of the valve assemblies at 1006, generating one or more sets of control signals for one or more of the valve assemblies associated with the command at 1008, and transmitting the one or more sets of control signals to the one or more individual control modules at 1010.

According to one aspect, the system for controlling, maintaining, and operating one or more valve assemblies described above may be implemented with one or more additional components, such as a thermal fuse or a thermal sensor, and configured to perform one or more valve operations based on one or more readings from the thermal fuse or the thermal sensor. Explained another way, the system for controlling, maintaining, and operating one or more valve assemblies may be outfitted or configured to close the valve assembly 100 upon detection of an event, such as an on-board fire, for example.

Figure 11:
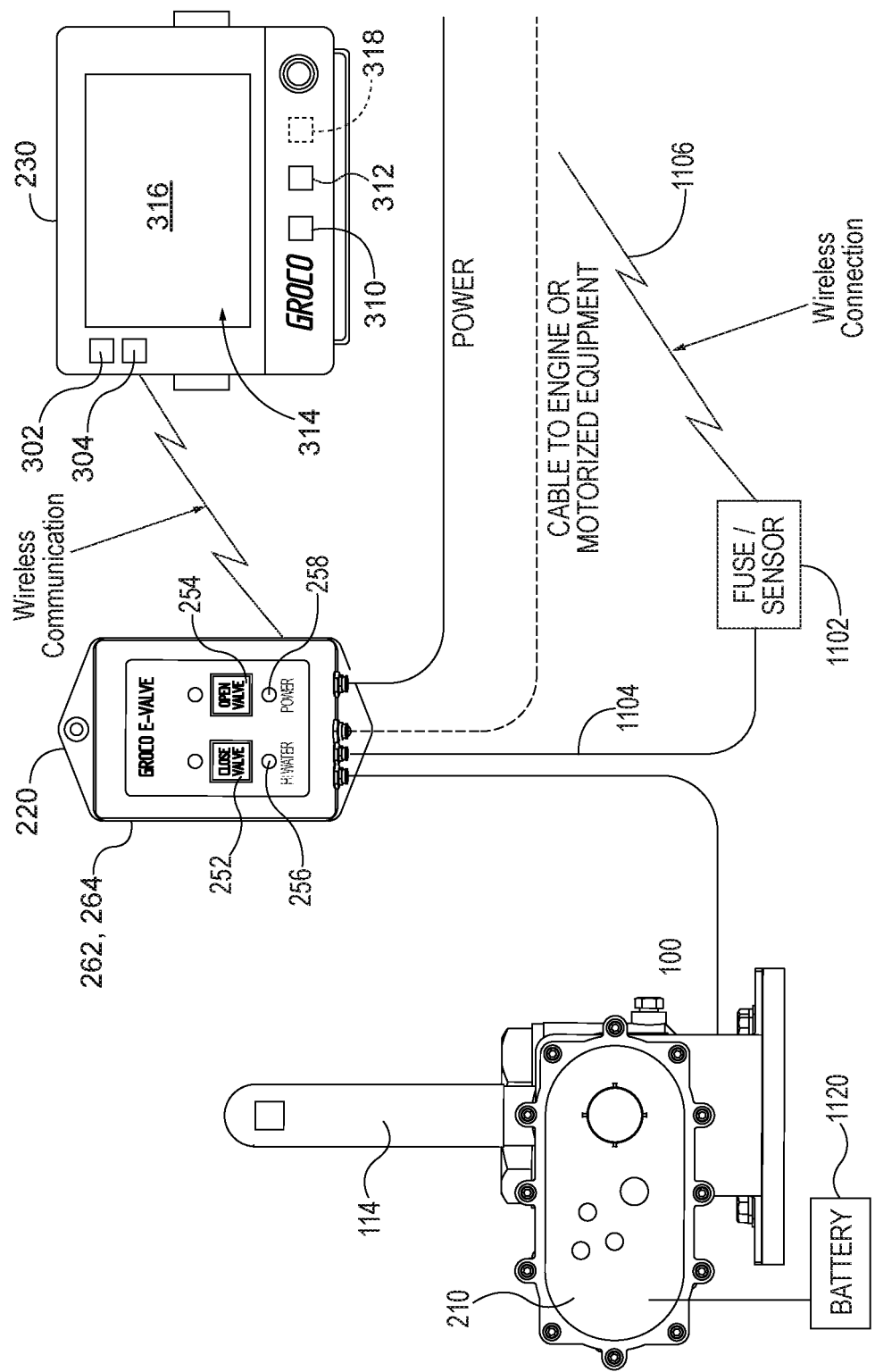
FIG. 11 is a component diagram of a system for maintaining and operating valve assemblies, such as the valve assembly of FIGS. 1A-1B.

In this regard, FIG. 11 is a component diagram of a system for maintaining and operating valve assemblies, such as the valve assembly 100 of FIGS. 1A-1B. According to one aspect, the system for maintaining and operating valve assemblies of FIG. 11 may be similar to the system for maintaining and operating valve assemblies of FIG. 5, but further include a thermal sensing element 1102. The thermal sensing element 1102 may be the thermal fuse or the thermal sensor. According to one aspect, this thermal sensing element 1102 may be connected via an electrical connection 1104 to the individual control module 220. According to another aspect, the thermal sensing element 1102 may be connected via a wireless connection 1106 to the master control module 230.

Regardless, the thermal sensing element 1102 may be associated with a threshold temperature, such as three hundred degrees Fahrenheit, for example. The thermal sensing element 1102 may be positioned in the engine room, where a fire may be located. If the thermal sensing element 1102 is a thermal fuse, and the temperature at the location of the thermal fuse exceeds the threshold temperature, the thermal fuse may melt, thereby interrupting a circuit associated with the thermal sensing element 1102. In response to receiving a thermal signal from the thermal sensing element 1102, the individual control module 220 may generate a control signal (e.g., the signal to close the valve assembly 100) based on the thermal signal from the thermal sensing element 1102 and command the corresponding, connected valve assembly 100 to perform an operation based on the melting of the thermal fuse, such as to close the valve assembly 100 if the valve assembly 100 is in an open state. If the valve assembly 100 is already in a closed state, no signal may be sent from the individual control module 220 to the valve assembly 100.

According to one aspect, the master control module 230 may, in response to a melted thermal fuse indication via the wireless connection 1106, command the corresponding individual control module 220 which is connected to and controls the valve assembly 100 to perform the operation based on the melting of the thermal fuse, such as to close the valve assembly 100 if the valve assembly 100 is in the open state. In other words, the receiver of the master control module 230 may receive a thermal signal from the thermal sensing element 1102. The processor of the master control module 230 may generate one or more sets of control signals (e.g., the signal to close the valve assembly 100) based on the thermal signal from the thermal sensing element 1102. The transmitter of the master control module 230 may transmit one or more sets of control signals (e.g., the signal to close the valve assembly 100) to one or more individual control modules (e.g., individual control module 220) based on the thermal signal from the thermal sensing element 1102. Again, if the valve assembly 100 is already in a closed state, no signal may be sent from the master control module 230 or the individual control module 220 to the valve assembly 100. In this way, one or more valves may be closed automatically in the event of an on-board fire, for example.

It will be appreciated that similar operation may be performed if the thermal sensing element 1102 is the thermal sensor rather than the thermal fuse. According to one aspect, the valve assembly 100 may include a battery backup 1120 which enables operation of the valve assembly 100 even when power is lost. In other words, the battery backup 1120 may supply power to the valve assembly 100 during power outage conditions. Further, it will be appreciated that the thermal sensing element 1102 may be configured in a variety of ways. For example, the thermal sensing element 1102 may be incorporated into the valve assembly 100, the master control module 230, the individual control module 220, mounted in the engine room, on the engine, etc. The thermal sensing element 1102 may be electrically connected to one or more of the master control module 230 or the individual control module 220. The thermal sensing element 1102 may be in wireless communication with one or more of the master control module 230 or the individual control module 220. In this way, the master control module 230 or the individual control module 220 may automatically execute a close command for one or more valve assemblies, such as the valve assembly 100, which are open based on a temperature reading or the melted thermal fuse indication from the thermal sensing element 1102.

Other implementations may be possible, such as using a pressure sensor associated with a fire suppression system, for example. According to this aspect, the 1102 may be a pressure sensor electrically connected to one or more of the master control module 230 or the individual control module 220. The pressure sensor may be in wireless communication with one or more of the master control module 230 or the individual control module 220. In this way, the master control module 230 or the individual control module 220 may automatically execute a close command for one or more valve assemblies, such as the valve assembly 100, which are open based on a pressure reading from the pressure sensor indicative of a release of retardant (i.e., there is a pressure drop in the canister), by closing all valves or selected valves. In an emergency the operator may not necessarily have time to initiate a manual "CLOSE ALL" command. In this regard, no operator interface is required, and the thermal sensing element 1102 or pressure sensor may automatically trigger or initiate valve commands based on corresponding sensor readings.

The master control module for controlling multiple valve assemblies on a marine vessel may include a receiver, a processor, and a transmitter. The receiver may receive one of a global positioning system (GPS) vessel speed or a thermal signal from a thermal sensor. The processor may generate one or more sets of control signals for commanding one or more valve assemblies based on the GPS vessel speed or the thermal signal. The transmitter may transmit the one or more sets of control signals to one or more individual control modules. One or more of the individual control modules may be configured to control a position of one or more of the corresponding valve assemblies based on one or more sets of the control signals. According to one aspect, a processor controlling one or more valve assemblies on a marine vessel that interprets GPS vessel speed to modulate one or more valve handles to increase or decrease flow through the valve(s) to maintain a pre-selected ideal rate of flow. According to another aspect, a processor controlling one or more valve assemblies on a marine vessel that receives input from an on-board fire suppression system, or from a thermal switch, and commands one or more valves selectively to close.

The processor may receive a speed signal from the vessel GPS system, and may generate one or more sets of commands to one or more individual valve control modules to adjust the valve handle position to be partially closed or partially open in order to maintain the pre-selected ideal flow rate through the valve. Additionally, as vessel speed increases or decreases, the changing GPS speed signal may be used to continually "trim" one or more valves to maintain ideal flow.

The processor may receive a signal from an on-board fire suppression system indicating that it has discharged its chemical fire retardant, or from a thermal switch (e.g., from a thermal sensor or other fire suppression sensor). The processor may be programmed to generate a close command to all valves or to a pre-selected set of valves in response to receiving this signal.

Figure 12:
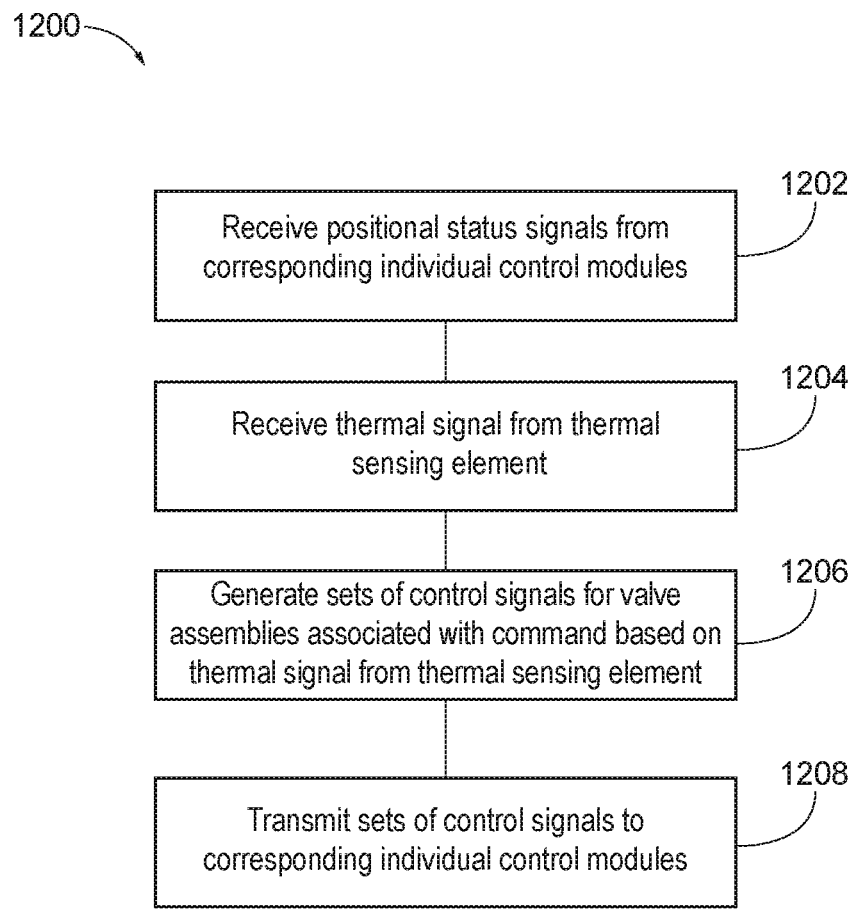
FIG. 12 is a flow diagram of a method for maintaining and operating valve assemblies, such as the valve assembly of FIGS. 1A-1B.

FIG. 12 is a flow diagram of a method 1200 for maintaining and operating valve assemblies, such as the valve assembly 100 of FIGS. 1A-1B. The method may include receiving 1202 one or more positional status signals from one or more corresponding individual control modules, each positional status signal indicative of a positional status of a valve assembly of one or more valve assemblies corresponding to a respective individual control module of the one or more individual control modules, receiving 1204 a thermal signal from a thermal sensing element, generating 1206 one or more sets of control signals for one or more of the valve assemblies associated with the command based on the thermal signal from the thermal sensing element, and transmitting 1208 the one or more sets of control signals to the one or more individual control modules.

Figure 13C:
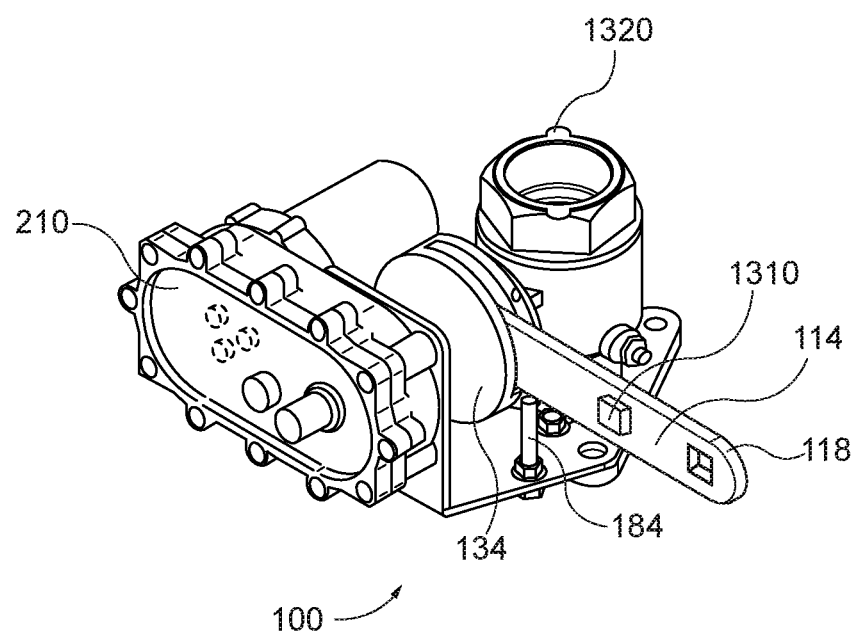

FIGS. 13A-13C are perspective views of the valve assembly of FIGS. 1A-1B in various operating conditions. As discussed with reference to FIGS. 1A-1B, the valve body 110 may include the opening which allows fluid to flow therethrough and may be moved between the open position, which corresponds to 100% flow, and the closed position, which corresponds to 0% flow. In other words, an open valve allows 100% of the possible flow through an unrestricted flow path, while a closed valve provides 0% of the possible flow against a completely blocked flow path.

The position sensors 181, 182, 183 (e.g., FIGS. 7A-7C) and/or current sensor 1310 may determine when the valve handle 114 is in the vertical position or the horizontal position (e.g., stopped at the hard stop 184) relative to the housing 180. In FIG. 13A, the valve handle 114 is in the vertical position. In FIG. 13B, the valve handle 114 has moved towards the horizontal position (e.g., via control signals from the individual control module 220, the master control module 230, or via manual operation). In FIG. 13B, it can be seen that an angle θ associated with the valve handle 114 may be determined by one or more of the position sensors 181, 182, 183, etc. In FIG. 13A, the valve handle 114 is in the horizontal position. In any event, the position of the valve handle 114 may travel in a 90-degree arc between the full-open and full-closed positions to enable or disable flow. The drive mechanism 210 may receive feedback from the position sensors 181, 182, 183, located on the valve assembly 100, and one or more motor current measurements from the current sensor 1310 to operate the valve assembly as commanded by the input component 314. According to one aspect, additional position sensors may be implemented, such as at 22.5-degrees, 45-degrees, 67.5-degrees, or any handle position in between 0 and 90-degrees.

According to one aspect, the input component 314 may receive a command associated with a desired flow characteristic. For example, the desired flow characteristic may be a percentage, a volume, a mass, or a density across time, etc. It may be desirable for the flow through the valve assembly 100 to be more than 0% but less than 100%, such as 42%, for example. To achieve this desired flow characteristic, the processor 310 may instruct or command the actuation cam 134 of the corresponding valve assembly 100 to rotate accordingly, such as to 42% of the 90-degree arc between the full-open and full-closed positions depicted in FIGS. 13A-13C, thereby enabling the valve handle 114, and thus, the valve to be partially open or partially closed. In this way, 'trimming' the flow through the valve body 110 may be achieved to the desired degree.

In the exemplary scenario where the desired flow characteristic is the percentage, such as 42%, the input component 314 (e.g., which may include a keyboard, a touch screen, a mouse, a microphone, a text to speech module, etc.) may receive the command including the desired flow characteristic. The display 316 of FIG. 5 may be the aforementioned touchscreen, which may allow an operator to provide a touch input indicating the desired 42% flow. As discussed above, the position sensors 181, 182, 183 (e.g., FIGS. 7A-7C) may receive one or more positional status signals from one or more corresponding individual control modules, each positional status signal is indicative of a positional status of a valve assembly 100 of multiple valve assemblies corresponding to a respective individual control module 220 of the one or more individual control modules. Stated another way, the position sensors 181, 182, 183 may determine the positional status of the corresponding valve handle 114 of the corresponding valve assembly 100. In this way, each positional status signal for each corresponding individual control module may be received from a position sensor associated with the corresponding individual control module indicative of an angle associated with a handle of the corresponding valve assembly.

The processor 310 (e.g., of the master control module) may generate one or more sets of control signals for one or more of the valve assemblies in accordance with the desired flow characteristic. For example, with reference to the exemplary scenario, the processor 310 may instruct or command the actuation cam 134 of the corresponding valve assembly 100 to rotate to 42% of the 90-degree arc between the full-open and full-closed positions (e.g., 37.8 degrees). In this way, the processor 310 may generate one or more of the sets of control signals for one or more of the valve assemblies based on the angle (e.g., theta) of the handle 114 of the corresponding valve assembly 100. The transmitter 302 may transmit one or more sets of the control signals to the respective individual control modules commanded to operate according to the desired flow characteristic. This operation may enable 'trimming' of the flow of fluid through respective valve bodies of valves controlled by the respective individual control modules to a desired percentage of full flow.

According to one aspect, the command may include a desired time or time window at which the desired flow characteristic is desired to be achieved. For example, although the valve handle 114 may move or travel between the full-open and full-closed positions within a predetermined time window, the command may indicate for the movement or opening and closing of the valve assembly 100 (i.e., movement of the valve handle 114) to occur slower than the fastest possible motion or movement between the two positions (e.g., open position and closed position or horizontal and vertical positions). According to one aspect, the processor 310 may record a transit time associated a change in the positional status of one or more of the valve assemblies of the multiple valve assemblies from the open position to the closed position or from the closed position to the open position. Because different valve assemblies may be associated with different transit times and because operating conditions may change (e.g., temperature, wear and tear, consistency of the water, saliency, etc.), the processor 310 may record one or more transit times for one or more of the valve assemblies and generate one or more of the sets of control signals for one or more of the valve assemblies based on the desired flow characteristic and a portion (or the entirety) of the transit time. In this way, the processor 310 may 'learn' the transit time for each valve assembly. According to one aspect, the percentage may be calculated based on the transit time rather than the angle. For example, if the transit time is five seconds, 20% flow would result in movement of the valve for one second.

For example, if the opening and closing of the valve assembly 100 under normal operation is measured to be five seconds by the processor 310, commands may be issued to the input component instructing the individual control module 220 to control the position of the valve handle 114 to move at a rate slower than the normal operation, such as from open position to closed position in ten seconds, etc. This different type of movement rate may be applied to commands instructing the valve assembly 100 to operate in accordance with the desired flow characteristic, such as by including a desired time or time window at which the desired flow characteristic is desired to be achieved. Further, the processor 310 may synchronize the desired flow characteristic across multiple valve assemblies (e.g., of different sizes, types, etc.).

A flow rate sensor 1320 may be implemented to measure a flow rate associated with a valve assembly. The flow rate may be communicated to the receiver 304 of the master control module as one or more flow monitor signals associated with one or more of the corresponding individual control modules. Each flow monitor signal may be indicative of a flow associated with a valve assembly of the multiple valve assemblies corresponding to respective individual control modules. Flow may be measured as a percentage, a volume, a mass, or a density across time.

The processor 310 may implement the desired flow characteristic using a feedback or feedforward loop. For example, the processor 310 may generate one or more sets of updated control signals for the valve assemblies having the "unlocked" lock status based on one or more of the flow monitor signals.

Further, the processor 310 may program the switch 252, 254, etc. of one of more of the individual control modules 220 to control the position of one or more of the corresponding valve assemblies based on the desired flow characteristic. For example, if a desired flow characteristic is 42%, a press of the button 252 for the individual control module 220 may cause the corresponding valve assembly 100 to operate at the desired 42% flow rate.

According to one aspect, when implemented within a marine application, the open (or partially open) valve body 110 allows water to flow from outside the marine vessel, into the marine vessel through a plumbing system, and is exhausted outside the marine vessel. The flow is generated by a pump, the output of which defines the flow rate. When the marine vessel is stationary, the flow rate is constant, and is defined by the output of the pump. When the marine vessel is moving, water may be forced through the valve body 110, and the flow rate is defined by a combination of the pump output and the flow forced by marine vessel movement or momentum. As momentum increases, forced flow increases, regardless of the pump flow output. When a flow rate or percentage of full flow is commanded, feedback from the flow sensor 1320 guides the valve controller or the processor 310 to 'trim' the valve to achieve the desired flow, even as the marine vessel's momentum increases or decreases. According to another aspect, with positional feedback from the sensors 181, 182, 83, flow may be 'trimmed' by commanding changes to the valve handle position. According to another aspect, flow sensors, such as the flow sensors of U.S. Pat. No. 7,491,320, may be the flow sensors utilized to monitor accuracy of the flow rate versus the desired flow rate in association with implementing the desired flow characteristic using the feedback or feedforward loop.

According to one aspect, when implemented within a marine application, multiple valves may located in the engine compartment of a vessel. Valves may be programmed to react to a change in status of a thermal switch or thermal fuse, or to a pressure drop in an on-board fire suppression system. Valves may be programmed to automatically close without an operator commands to do so, such as when the temperature at the location of the thermal fuse exceeds a threshold temperature. Additionally, the operator may be alerted as to a change of a thermal switch or fuse, or to a pressure drop in the on-board fire suppression system, such as via the display 316 on the master control module 230 or via the audio component 318, for example.

Figure 14:
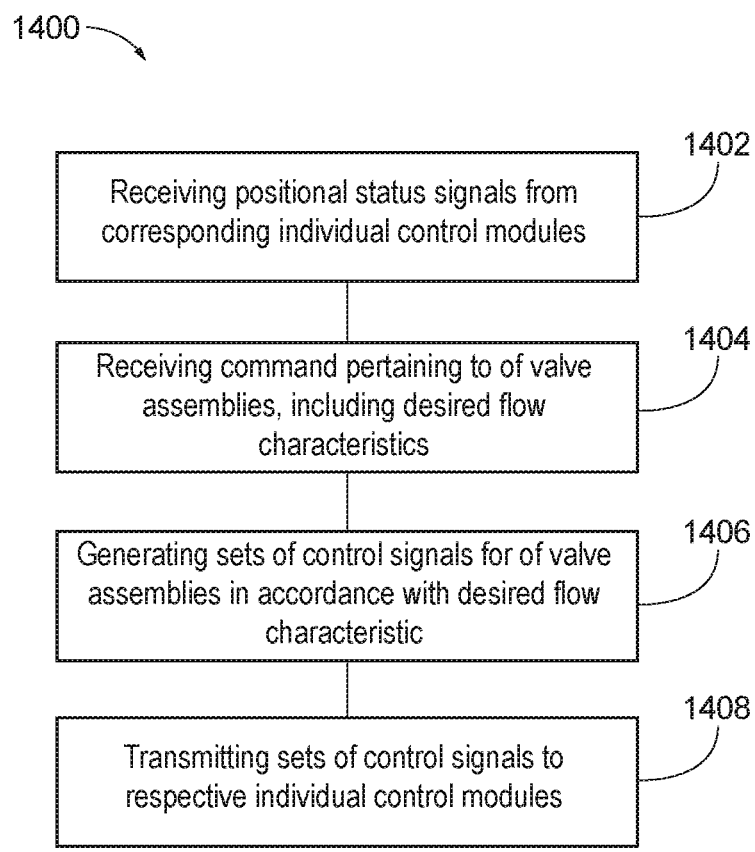
FIG. 14 is a flow diagram of a method for maintaining and operating valve assemblies, such as the valve assembly of FIGS. 1A-1B or FIGS. 13A-13C.

FIG. 14 is a flow diagram of a method for maintaining and operating valve assemblies, such as the valve assembly of FIGS. 1A-1B or FIGS. 13A-13C. The method 1400 may include receiving 1402, via a receiver, one or more positional status signals from one or more corresponding individual control modules, each positional status signal is indicative of a positional status of a valve assembly of multiple valve assemblies corresponding to a respective individual control module of the one or more individual control modules; receiving 1404, via an input component, a command pertaining to one or more of the valve assemblies, wherein the command includes a desired flow characteristic for one or more of the valve assemblies; generating 1406, via a processor, one or more sets of control signals for one or more of the valve assemblies in accordance with the desired flow characteristic; and transmitting 1408, via a transmitter, the one or more sets of control signals to the respective one or more individual control modules.

It will be appreciated that various of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A master control module controlling multiple valve assemblies on a marine vessel, comprising:
    a receiver that receives one of a global positioning system (GPS) vessel speed or a thermal signal from a thermal sensor;
    a processor that generates one or more sets of control signals for a command commanding one or more valve assemblies based on the GPS vessel speed and the thermal signal; and
    a transmitter that transmits the one or more sets of control signals to one or more individual control modules,
        wherein one or more of the individual control modules is configured to control a position of one or more of the corresponding valve assemblies based on one or more sets of the control signals.

2. The master control module of claim 1, wherein one or more sets of the control signals for commanding one or more of the valve assemblies is based on the GPS vessel speed or the thermal signal and a desired flow characteristic including a percentage, a volume, a mass, or a density across time.

3. The master control module of claim 1, wherein the command includes a desired time or time window at which a desired flow characteristic is desired to be achieved.

4. The master control module of claim 1, wherein one or more positional status signal for each corresponding individual control module is received from a position sensor associated with the corresponding individual control module indicative of an angle associated with a handle of the corresponding valve assembly.

5. The master control module of claim 4, wherein the processor generates one or more of the sets of control signals for one or more of the valve assemblies based on the angle of the handle of the corresponding valve assembly.

6. The master control module of claim 1, wherein the processor records a transit time associated a change in a positional status of one or more of the valve assemblies of the multiple valve assemblies from an open position to a closed position or from the closed position to the open position.

7. The master control module of claim 6, wherein the processor generates one or more of the sets of control signals for one or more of the valve assemblies based on a desired flow characteristic and a portion of the transit time.

8. The master control module of claim 1, wherein the receiver receives one or more flow monitor signals from one or more of the corresponding individual control modules, each flow monitor signal is indicative of a flow associated with a valve assembly of the multiple valve assemblies corresponding to respective individual control modules.

9. The master control module of claim 8, wherein the processor generates one or more sets of updated control signals for the valve assemblies having the "unlocked" lock status based on one or more of the flow monitor signals.

10. The master control module of claim 1, wherein the processor of the master control module programs a switch of one of more of the individual control modules to control the position of one or more of the corresponding valve assemblies based on a desired flow characteristic.

11. A method for controlling one or more valve assemblies, comprising:
    receiving, via a receiver, one of a global positioning system (GPS) vessel speed or a thermal signal from a thermal sensor;
    generating, via a processor, one or more sets of control signals for a command commanding one or more of the valve assemblies based on the GPS vessel speed and the thermal signal and a desired flow characteristic; and
    transmitting, via a transmitter, the one or more sets of control signals to the respective one or more individual control modules, wherein one or more of the individual control modules is configured to control a position of one or more of the corresponding valve assemblies based on one or more sets of the control signals.

12. The method for controlling one or more valve assemblies of claim 11, wherein the desired flow characteristic is a percentage, a volume, a mass, or a density across time.

13. The method for controlling one or more valve assemblies of claim 11, wherein the command includes a desired time or time window at which the desired flow characteristic is desired to be achieved.

14. The method for controlling one or more valve assemblies of claim 11, wherein each positional status signal for each corresponding individual control module is received from a position sensor associated with the corresponding individual control module indicative of an angle associated with a handle of the corresponding valve assembly.

15. The method for controlling one or more valve assemblies of claim 14, comprising generating one or more of the sets of control signals for one or more of the valve assemblies based on the angle of the handle of the corresponding valve assembly.

16. The method for controlling one or more valve assemblies of claim 11, comprising recording a transit time associated a change in a positional status of one or more of the valve assemblies of the multiple valve assemblies from an open position to a closed position or from the closed position to the open position.

17. The method for controlling one or more valve assemblies of claim 16, comprising generating one or more of the sets of control signals for one or more of the valve assemblies based on the desired flow characteristic and a portion of the transit time.

18. The method for controlling one or more valve assemblies of claim 11, comprising receiving one or more flow monitor signals from one or more of the corresponding individual control modules, each flow monitor signal is indicative of a flow associated with a valve assembly of the multiple valve assemblies corresponding to respective individual control modules.

19. The method for controlling one or more valve assemblies of claim 18, comprising generating one or more sets of updated control signals for the valve assemblies having the "unlocked" lock status based on one or more of the flow monitor signals.

20. A control module controlling multiple valve assemblies on a marine vessel, comprising a processor:
  receiving one of a global positioning system (GPS) vessel speed or a thermal signal from a thermal sensor;
  generating one or more sets of control signals for commanding one or more valve assemblies based on the GPS vessel speed and the thermal signal; and
  transmitting the one or more sets of control signals to one or more individual control modules,
  wherein one or more of the individual control modules is configured to control a position of one or more of the corresponding valve assemblies based on one or more sets of the control signals.

\* \* \* \* \*